US011583773B2

(12) United States Patent
Sakurai

(10) Patent No.: US 11,583,773 B2
(45) Date of Patent: Feb. 21, 2023

(54) GAME APPARATUS, STORAGE MEDIUM STORING GAME PROGRAM, GAME SYSTEM, AND GAME PROCESSING METHOD

(71) Applicant: NINTENDO CO., LTD., Kyoto (JP)

(72) Inventor: Masahiro Sakurai, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 169 days.

(21) Appl. No.: 16/538,056

(22) Filed: Aug. 12, 2019

(65) Prior Publication Data
US 2020/0108317 A1     Apr. 9, 2020

(30) Foreign Application Priority Data

Oct. 4, 2018   (JP) .............................. JP2018-189212
Oct. 4, 2018   (JP) .............................. JP2018-189213

(51) Int. Cl.
    *A63F 13/63*     (2014.01)
    *A63F 13/25*     (2014.01)
    (Continued)

(52) U.S. Cl.
    CPC .............. *A63F 13/63* (2014.09); *A63F 13/25* (2014.09); *A63F 13/42* (2014.09); *A63F 13/537* (2014.09);
    (Continued)

(58) Field of Classification Search
    None
    See application file for complete search history.

(56) References Cited

U.S. PATENT DOCUMENTS 6,273,822 B1   8/2001   Tanaka
6,354,940 B1   3/2002   Itou et al.
(Continued)

FOREIGN PATENT DOCUMENTS

JP   2014-061123 A   4/2014
JP   2014-233388 A   12/2014
(Continued)

OTHER PUBLICATIONS

"Smash Bros. Dojo??", online, Nintendo Co., Ltd., searched on Sep. 13, 2018, internet <https://www.smashbros.com/wii/jp/gamemode/modea/modea12.html> with its English site <https://www.smashbros.com/wii/en_us/gamemode/modea/modea12.html>, printed Aug. 8, 2019.
(Continued)

*Primary Examiner* — Omkar A Deodhar
(74) *Attorney, Agent, or Firm* — Scully, Scott, Murphy & Presser, P.C.

(57) ABSTRACT

An example game apparatus selects an operational character that is to be used by a player in a multiplayer game with competition. The game apparatus selects an additional character that is to be added to the operational character from a plurality of candidates for an additional character to be selected. The additional character is associated with an image of the additional character, information of an effect to be given to performance in the game with competition of the operational character to which the additional character is added, and information about a type. The game apparatus generates a selection image including at least an image of the operational character selected by the player and each other user, an image of the additional character selected by the player, and an image of the type of the additional character, for display, during selection of the operational character and the additional character.

22 Claims, 17 Drawing Sheets

(51) Int. Cl.
    *A63F 13/833*     (2014.01)
    *A63F 13/42*     (2014.01)
    *A63F 13/537*     (2014.01)
    *A63F 13/58*     (2014.01)
    *A63F 13/795*     (2014.01)
    *A63F 13/843*     (2014.01)
    *A63F 13/847*     (2014.01)
    *A63F 13/24*     (2014.01)
    *A63F 13/327*     (2014.01)
    *A63F 13/214*     (2014.01)

(52) U.S. Cl.
    CPC ............ *A63F 13/58* (2014.09); *A63F 13/795* (2014.09); *A63F 13/833* (2014.09); *A63F 13/843* (2014.09); *A63F 13/847* (2014.09); *A63F 13/214* (2014.09); *A63F 13/24* (2014.09); *A63F 13/327* (2014.09); *A63F 2300/1043* (2013.01); *A63F 2300/1075* (2013.01); *A63F 2300/405* (2013.01); *A63F 2300/6018* (2013.01); *A63F 2300/8029* (2013.01)

(56) References Cited

U.S. PATENT DOCUMENTS

| | | | |
|---|---|---|---|
| 8,168,435 | B2 | 5/2012 | Noguchi et al. |
| 8,801,515 | B2 | 8/2014 | Ikeda |
| 9,333,419 | B2 | 5/2016 | Shimono et al. |
| 9,636,592 | B2 | 5/2017 | Takeuchi |
| 2004/0221224 | A1 | 11/2004 | Blattner et al. |
| 2006/0040738 | A1 | 2/2006 | Okazaki et al. |
| 2014/0004947 | A1 | 1/2014 | Yamaguchi et al. |
| 2014/0087836 | A1 | 3/2014 | Sato |
| 2014/0248948 | A1 | 9/2014 | Ho et al. |
| 2014/0357360 | A1 | 12/2014 | Shono et al. |
| 2014/0364211 | A1 | 12/2014 | Masuda |
| 2015/0080122 | A1 | 3/2015 | Motokura et al. |
| 2015/0141141 | A1 | 5/2015 | Suzuki et al. |
| 2015/0202532 | A1 | 7/2015 | Takeuchi |
| 2015/0367240 | A1 | 12/2015 | Otomo |
| 2016/0236078 | A1 | 8/2016 | Tokunaga |
| 2018/0207537 | A1 | 7/2018 | Kishimoto et al. |
| 2019/0160379 | A1* | 5/2019 | Matsushita ......... A63F 13/5375 |
| 2020/0023280 | A1 | 1/2020 | Onda et al. |

FOREIGN PATENT DOCUMENTS

| | | |
|---|---|---|
| JP | 2016-165360 A | 9/2016 |
| JP | 2017-185369 A | 10/2017 |

OTHER PUBLICATIONS

U.S. Appl. No. 16/538,244, filed Aug. 12, 2019.
Yasuhara, K., "Boku no Natsuyasumi Portable 2, Equalifolia, Secret of Sunken Vessels", Aug. 19, 2010, pp. 32-33.
Masato, I., "Wii U version Hyrule Warriors complete guide", Aug. 28, 2014, pp. 14-15 and 140-142.
Yasuhara, K., "Boku no Natsuyasumi Portable 2, Equalifolia, Secret of Sunken Vessels", Aug. 19, 2013, pp. 32-33.
Masaru, I., "Wii U version Hyrule Warriors complete guide", Aug. 28, 2014, pp. 14-15 and 140-142.
Notice of Reasons for Refusal dated Feb. 1, 2021 received in Japanese Patent Application No. JP 2018-189213 together with and English language translation.

* cited by examiner

GAME APPARATUS, STORAGE MEDIUM STORING GAME PROGRAM, GAME SYSTEM, AND GAME PROCESSING METHOD

CROSS REFERENCE TO RELATED APPLICATIONS

The disclosures of Japanese Patent Application No. 2018-189212, filed Oct. 4, 2018, and Japanese Patent Application No. 2018-189213, filed Oct. 4, 2018, are incorporated herein by reference in their entirety.

FIELD

The technology disclosed herein relates to game apparatuses, storage media storing game programs, game systems, and game processing methods for performing games with competition.

BACKGROUND AND SUMMARY

There are conventional game programs that can enhance the performance of a player character in an action game by giving a predetermined effect to the character.

In such game programs, the effect is allowed to be given in the single-player mode, but not when the action game is a game with competition. Therefore, in the case where multiple players compete with each other, the players can use tactics to select a character, but the feature of giving the effect cannot be utilized to improve the strategic aspect of a game with competition.

Under these circumstances, the present application discloses a game apparatus, storage medium storing a game program, game system, and game processing method capable of improving the strategic aspect of a game with competition.

(1) A non-limiting example of a game apparatus disclosed herein selects an operational character that is to be used by a player in a multiplayer game, based on an operational input for specifying one of a plurality of candidates for an operational character to be selected. The game apparatus selects an additional character that is to be added to the operational character, based on an operational input for specifying one of a plurality of candidates for an additional character to be selected. The additional character is associated with at least an image of the additional character, information of an effect to be given to performance in the multiplayer game of the operational character to which the additional character is added, and information about a type having advantage and disadvantage. The game apparatus generates a selection image including at least an image of the operational character selected by the player and each other user participating in the multiplayer game, an image of the additional character selected by the player, and an image of the type of the additional character, for display, during selection of the operational character and the additional character. The game apparatus controls the selected operational character, in a virtual space, according to an operational input, and processes a multiplayer game based on the performance of the operational character given the effect associated with the selected additional character, and the advantage and disadvantage of the type associated with the additional character.

According to the feature of (1), when an operational character and an additional character are selected in the multiplayer game, operational characters, additional character, and information about their types are shown to a player. Therefore, tactics can be used to select a character in the multiplayer game, resulting in an improvement in the amusingness of the multiplayer game.

(2) The game apparatus may further generate, in the multiplayer game, a game image including at least an image of the virtual space, an image of the selected operational character, an image of the selected additional character, and an image of the type of the additional character, for display.

According to the feature of (2), useful information such as operational characters, additional character, and information about their types can be shown to a player not only during selection of a character but also in the multiplayer game.

(3) The game apparatus may store one or more of the additional characters that are previously specified by the player from a plurality of the additional characters, as a candidate for an additional character to be selected. The game apparatus may select an additional character from the stored candidates for an additional to be selected, in the additional character selection process.

According to the feature of (3), an additional character to be used in the multiplayer game is selected from selection candidates previously specified by a player. Therefore, previously specified selection candidates affect the strategic aspect of the multiplayer game, resulting in a further improvement in the strategic aspect of the multiplayer game.

(4) The game apparatus may further prepare a set of the additional character and an auxiliary character combined with the additional character, and store the prepared set as the candidate for an additional character to be selected. The auxiliary character may be associated with at least an image of the auxiliary character, and information of an effect to be given to the performance in the multiplayer game of the operational character to which the auxiliary character is added. If the additional character added to the operational character appearing in the multiplayer game is combined with the auxiliary character, the game apparatus may process the multiplayer game based on the performance of the operational character given the effect of the additional character as well as the effect of the auxiliary character.

According to the feature of (4), an operational character can be given an effect that depends on a combination of two kinds of characters, an additional character and an auxiliary character. Therefore, an increased variety of effects can be provided, resulting in a further improvement in the strategic aspect of the multiplayer game. In addition, a user may not separately select an additional character and an auxiliary character in the additional character selection process, resulting in an easier selection operation.

(5) The additional character may be associated with information of a capacity that is the maximum amount of the auxiliary character or characters which are allowed to be combined with the additional character. The auxiliary character may be associated with an amount of the auxiliary character that occupies the capacity when the auxiliary character is combined with the additional character. The game apparatus may prepare a set of the additional character and one or more of the auxiliary characters combined with the additional character, in the set preparation process, provided that the amount of the combined auxiliary character or characters is smaller than or equal to the capacity of the additional character.

According to the feature of (5), a condition is provided for an auxiliary character that can be combined with an additional character. As a result, more tactics can be used to prepare a set of an additional character and an auxiliary character, leading to a further improvement in the strategic aspect of the multiplayer game.

(6) The game apparatus may further update the information about the effect associated with each additional character such that the effect is enhanced, if a predetermined condition for the additional character is satisfied.

According to the feature of (6), a player can enhance an effect caused by an additional character by satisfying the above predetermined condition. As a result, the strategic aspect of the multiplayer game using an additional character can be further improved.

(7) The information about the type may indicate one of three kinds of types having a trilemma relationship and one kind of type without advantage and disadvantage in relation to the three kinds of types.

According to the feature of (7), the strategic aspect of the multiplayer game can be improved by a multiplayer game in which a type is taken into account.

(8) The game apparatus may execute a fighting game in the multiplayer game, and determine the amount of damage to a first operational character caused by a second operational character's attack, based on (a) the performances of the first and second operational characters, and (b) the advantage and disadvantage between the type of an additional character added to the first operational character and the type of an additional character added to the second operational character.

According to the feature of (8), the effect of an additional character is reflected on the amount of damage in a fighting game, and therefore, the strategic aspect of the fighting game can be effectively improved.

(9) The operational character may be associated with information of an operational character group to which the operational character belongs. The additional character may be associated with information of an additional character group to which the additional character belongs.

In the multiplayer game, if the additional character group to which the additional character added to the operational character belongs corresponds to the operational character group to which the operational character belongs, the game apparatus may increase the effect associated with the additional character more than if there is not the correspondence.

According to the feature of (9), an additional character can give a more complicated effect to an operational character, resulting in a further improvement in the strategic aspect of the multiplayer game.

(10) The selection image may further include an image of the operational character group to which the selected operational character belongs.

According to the feature of (10), an image of the operational character group is shown, and therefore, a player can select an operational character and an additional character whose groups correspond to each other by an easier operation.

Note that an example of a storage medium storing an information processing program that causes a processor of an information processing device to execute the processes of (1)-(10) is disclosed herein. An example of an information processing system that executes the processes of (1)-(10) is also disclosed herein. An example of an information processing method for causing an information processing system to execute the processes of (1)-(10) is also disclosed herein.

According to the above game apparatus, storage medium storing a game program, game system, and game processing method, the strategic aspect of a multiplayer game can be improved.

These and other objects, features, aspects and advantages of the present exemplary embodiment will become more apparent from the following detailed description of the present exemplary embodiment when taken in conjunction with the accompanying drawings.

DETAILED DESCRIPTION OF NON-LIMITING EXAMPLE EMBODIMENTS

[1. Configuration of Game System]

A game system according to an example of an exemplary embodiment will now be described. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). The hardware configuration of the game system 1 according to the exemplary embodiment will now firstly be described, and the control of the game system 1 according to the exemplary embodiment will then be described.

Figure 1:
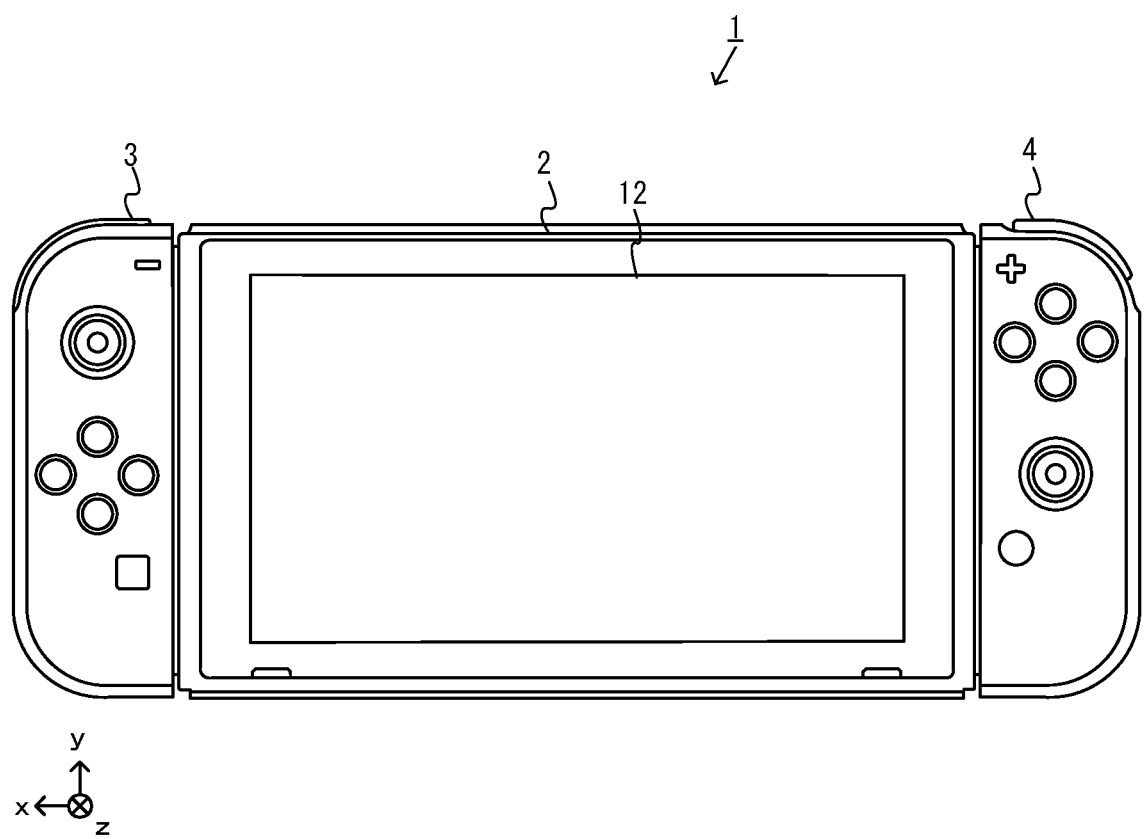
FIG. 1 is a diagram showing an example of a state where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
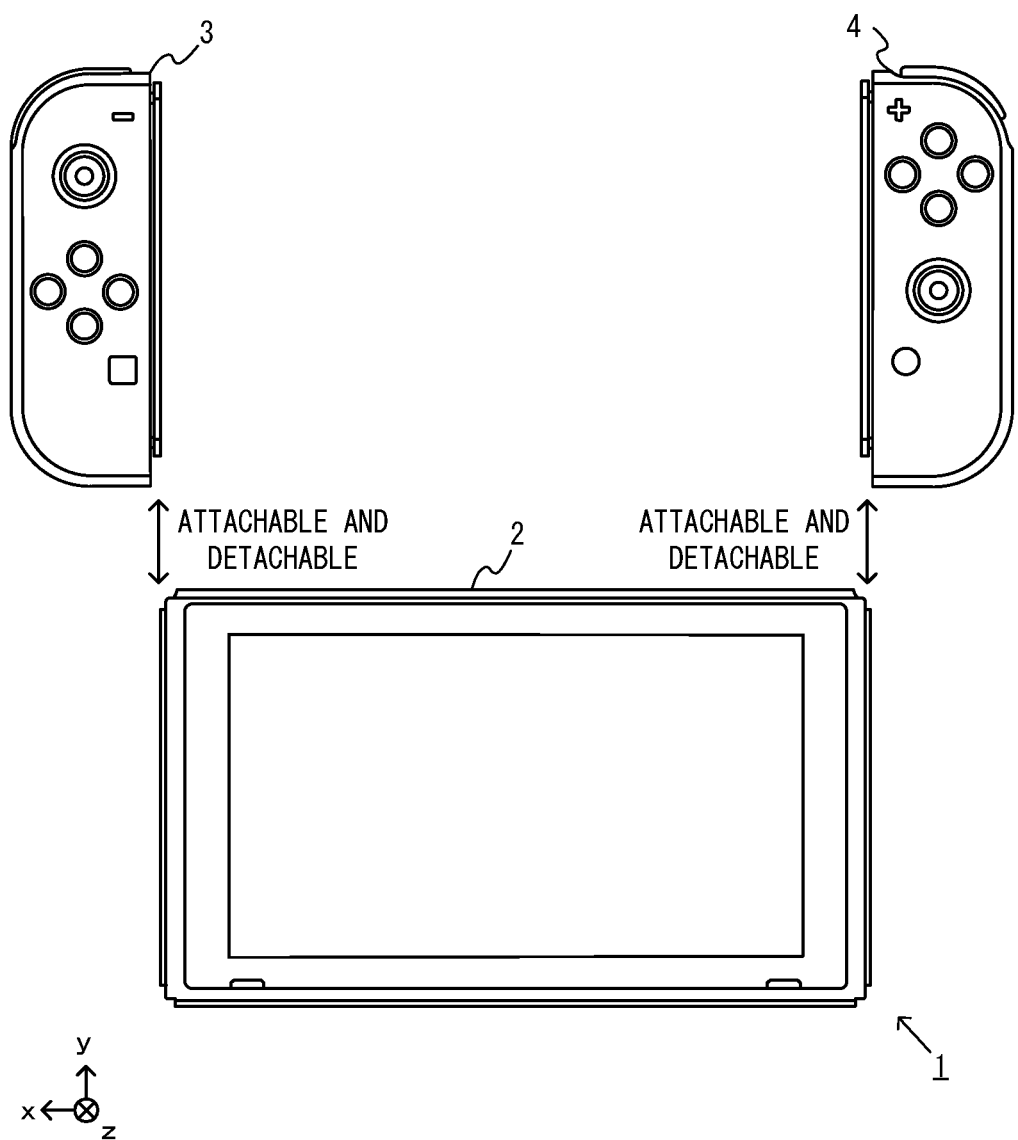
FIG. 2 is a diagram showing an example of a state where each of a non-limiting left controller and a non-limiting right controller is detached from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
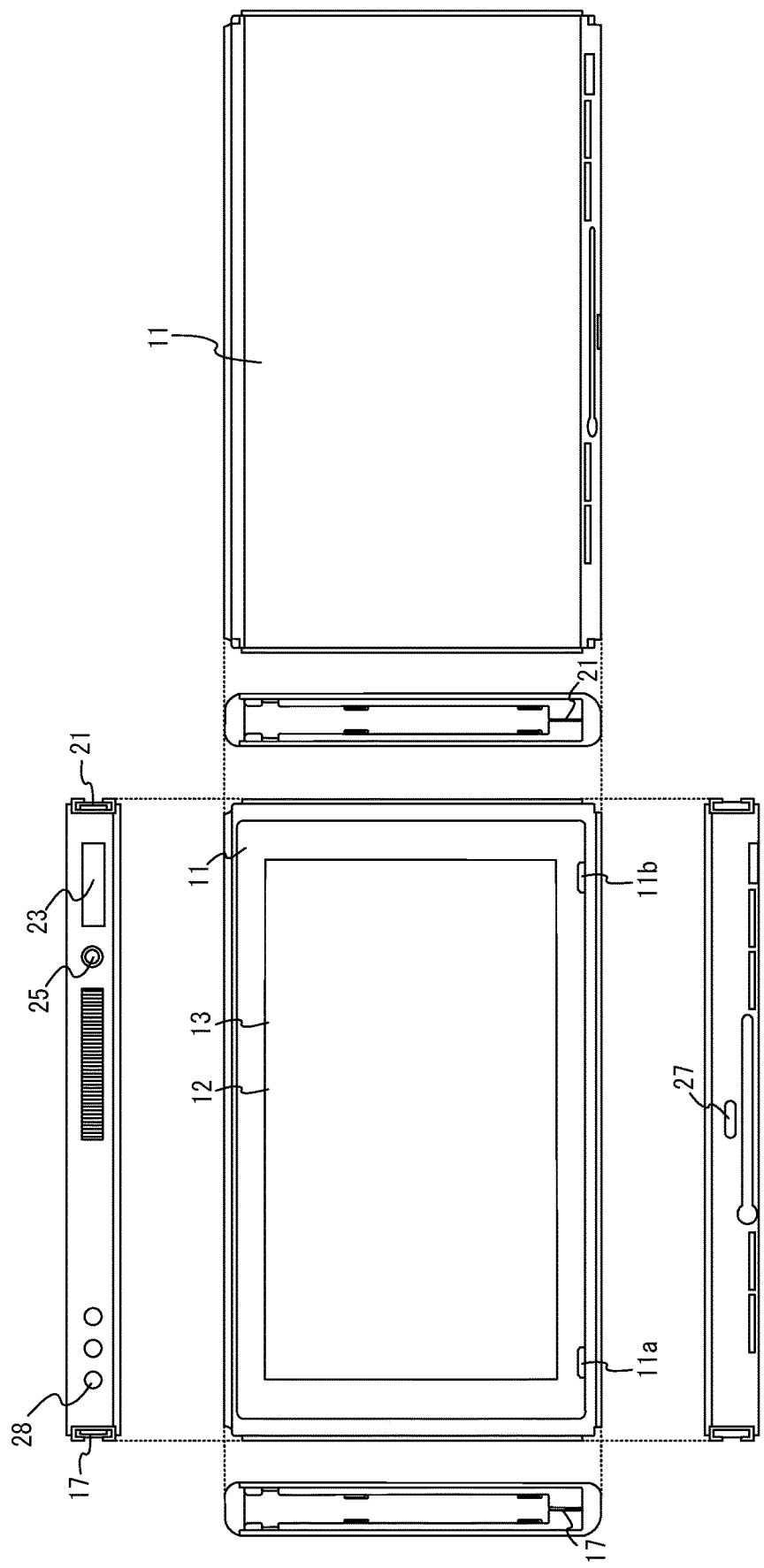
FIG. 3 is six orthogonal views showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
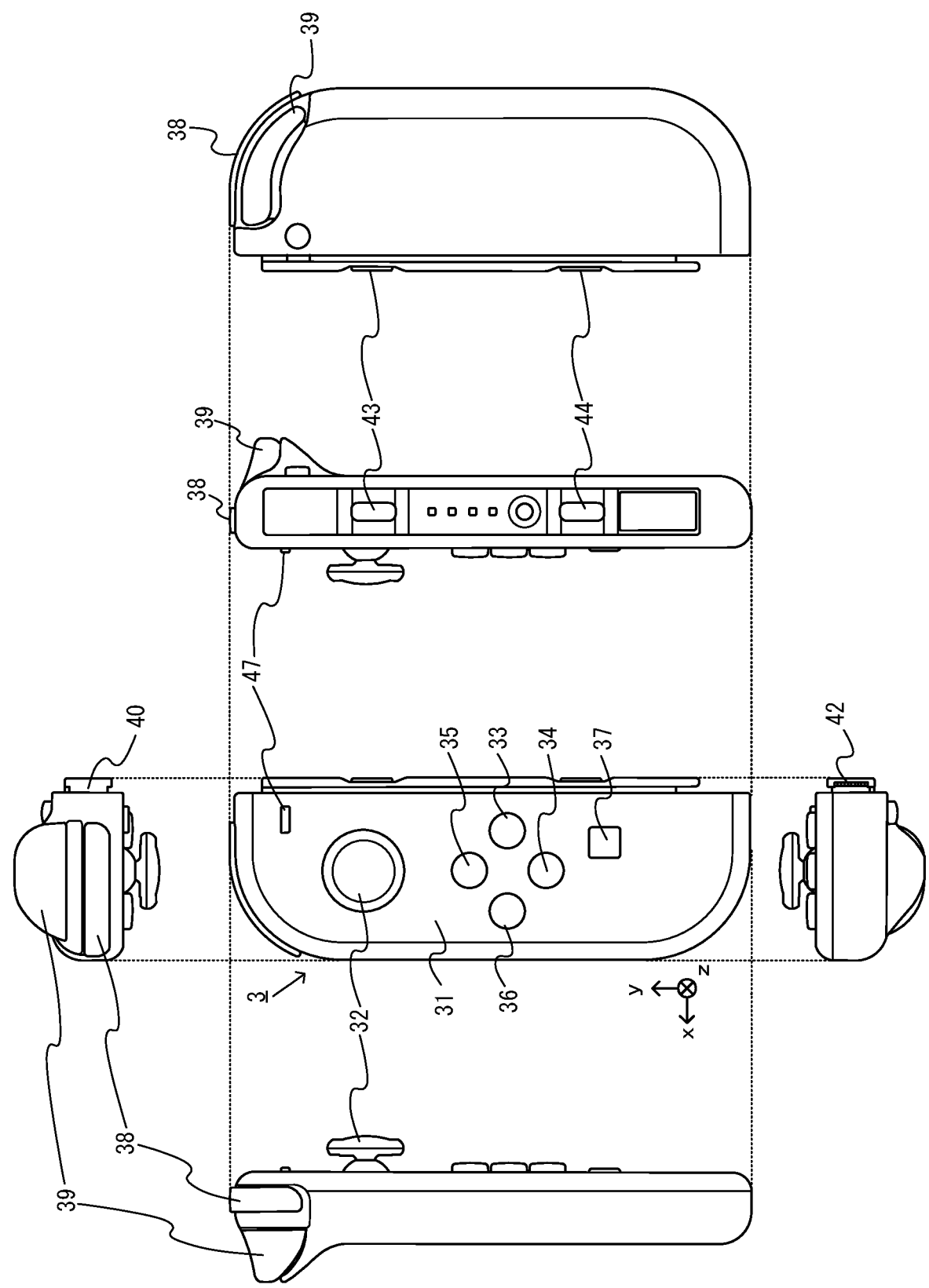
FIG. 4 is six orthogonal views showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
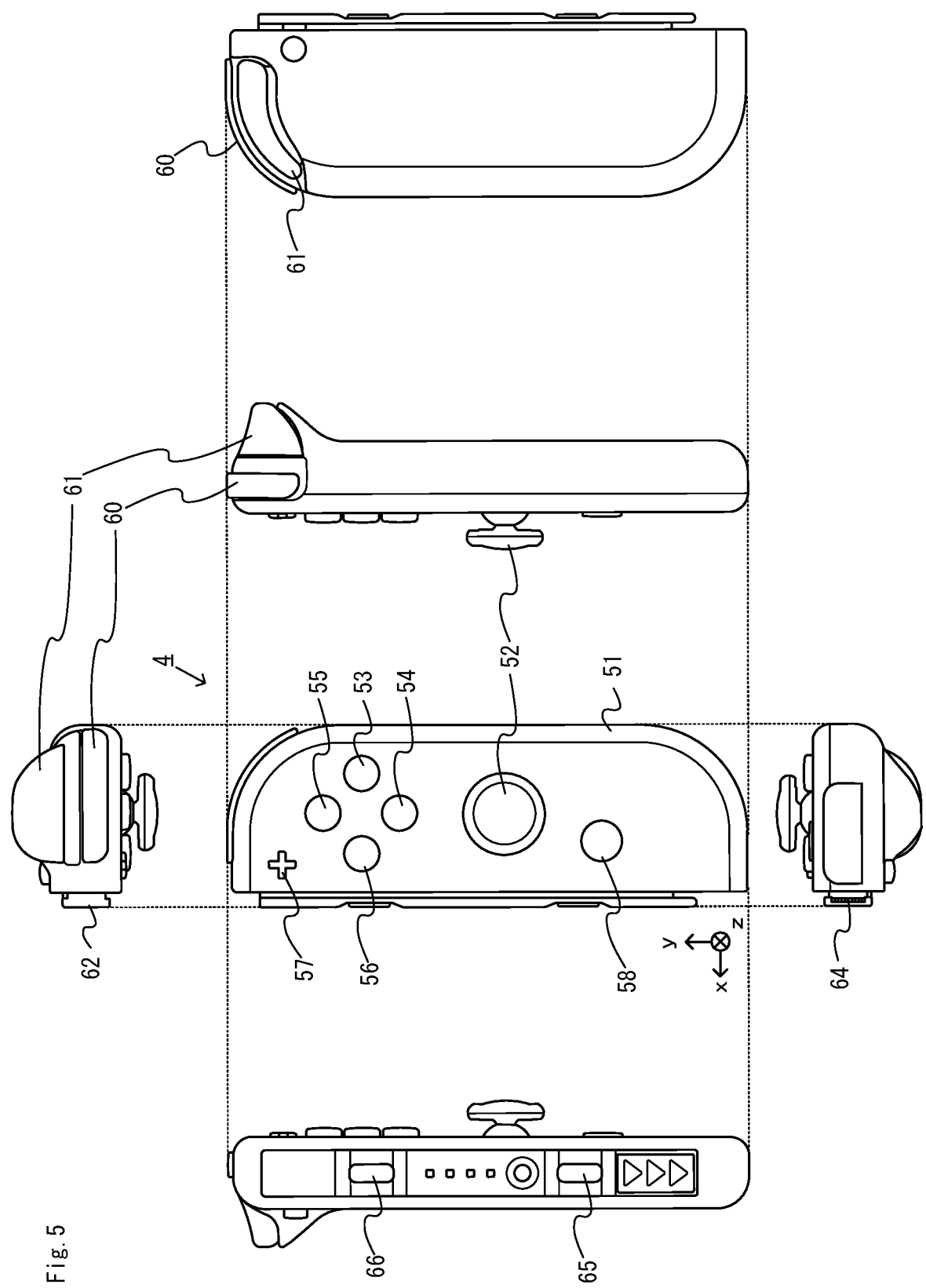
FIG. 5 is six orthogonal views showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
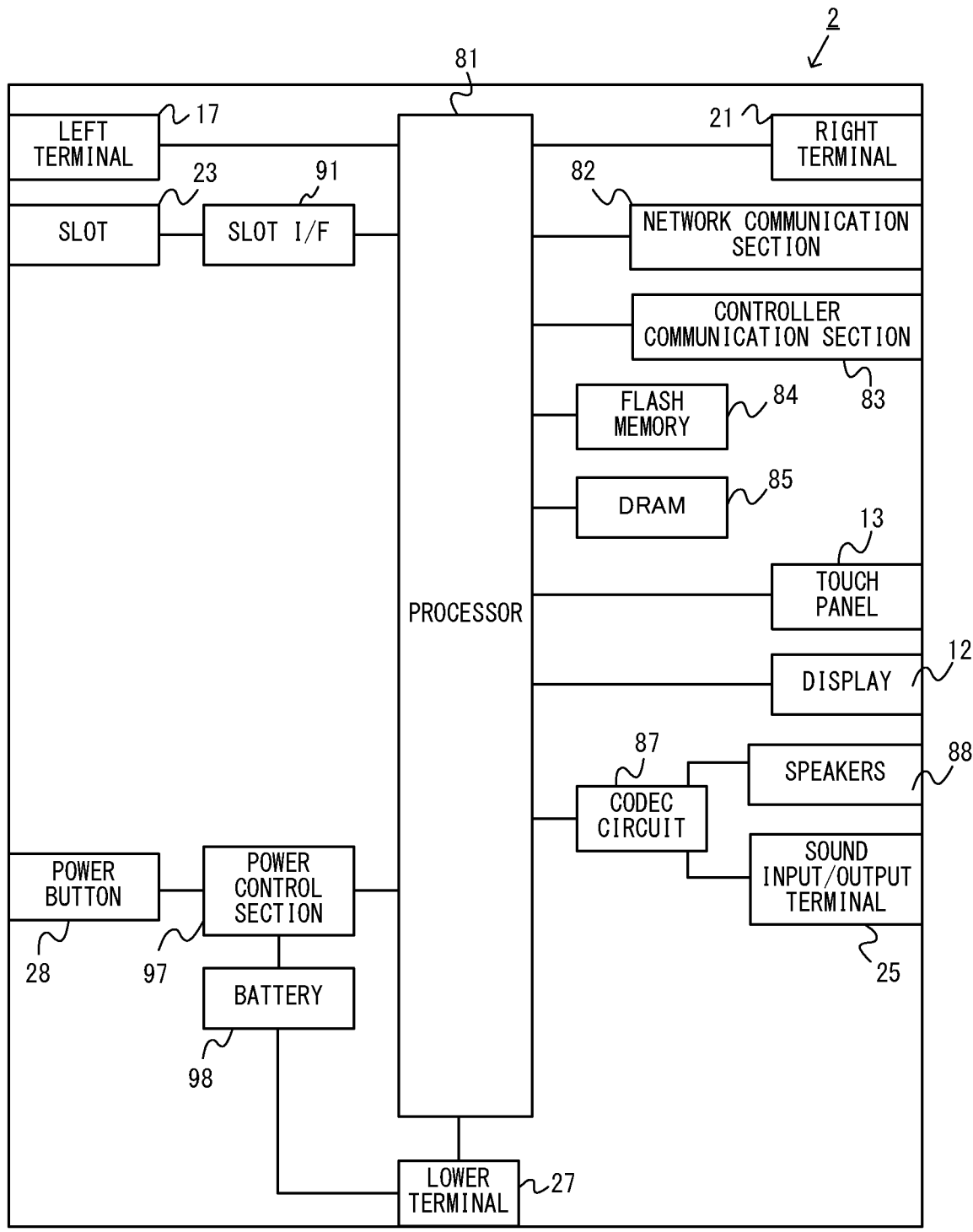
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 can also communicate with controllers different from the left controller 3 and the right controller 4. Therefore, the main body apparatus 2 can allow multiple users to play a game using a plurality of sets of different controllers.

Further, the display 12 is connected to the processor 81. The processor 81 causes the display 12 to display a generated image (e.g., an image generated by executing the above information processing) and/or an externally acquired image.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
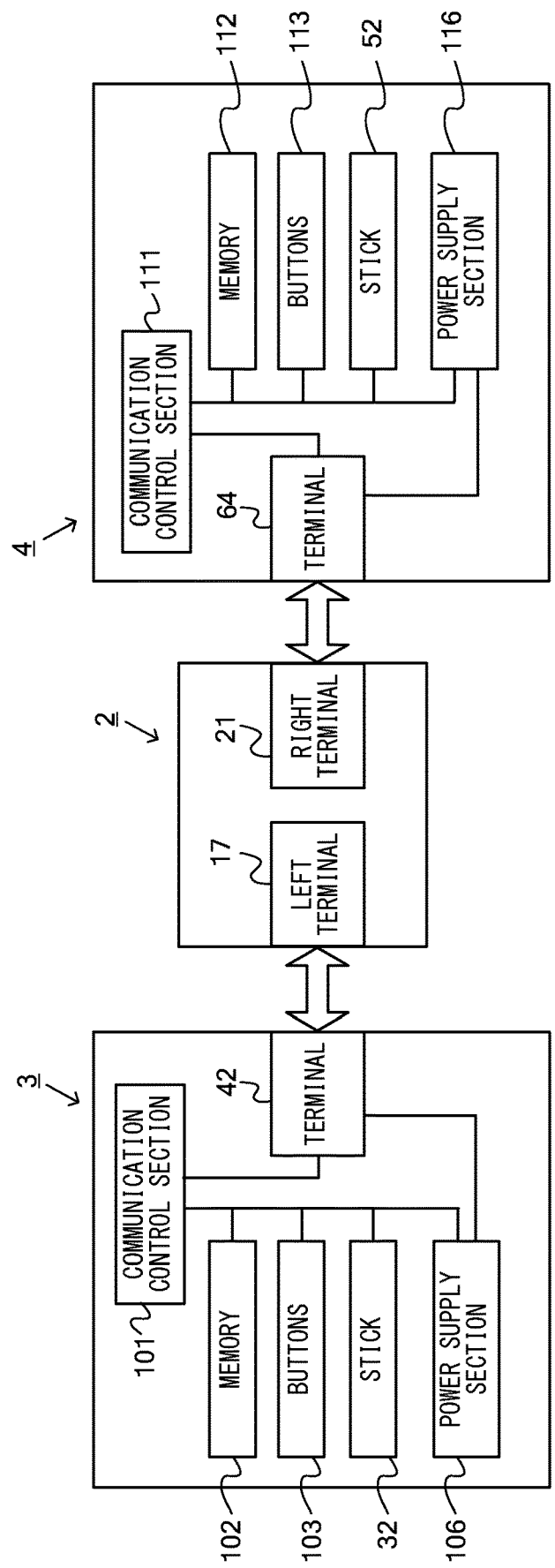
FIG. 7 is a block diagram showing examples of internal configurations of a non-limiting main body apparatus, a non-limiting left controller, and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes at least the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 106. In the exemplary embodiment, the power supply section 106 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes at least buttons 113 and the analog stick 52. These input sections have functions similar to those of the input sections of the left controller 3 and operate similarly to the input sections of the left controller 3.

The right controller 4 includes a power supply section 116. The power supply section 116 has a function similar to that of the power supply section 106 of the left controller 3 and operates similarly to the power supply section 106.

[2. Overview of Processing in Game System]

An information process executed in the game system 1 will be outlined with reference to FIGS. 8-13. In the exemplary embodiment, in the game system 1, an information process for a multiplayer game with competition is executed. In the game with competition, a plurality of players (in other words, users) each operate an operational character to play the game with competition. In the exemplary embodiment, the kind (in other words, genre) of the game with competition is assumed to be a fighting game. The game with competition may be of any suitable kind, such as a puzzle game or an action game. The number of players that are allowed to participate in the game with competition may be any number that is greater than or equal to two.

[2-1. Characters Used in Game]

Figure 8:
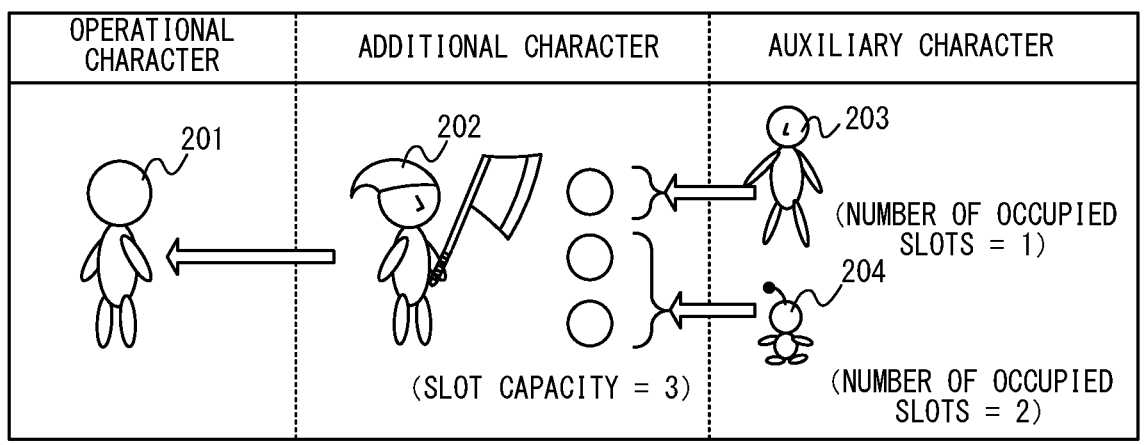
FIG. 8 is a diagram showing an example of a relationship between characters used in a non-limiting game with competition.

The kinds of characters used in the game with competition will be described with reference to FIG. 8. FIG. 8 is a diagram showing an example of a relationship between kinds of characters used in the game with competition. As show in FIG. 8, in the exemplary embodiment, three kinds of characters, an operational character 201, an additional character 202, and auxiliary characters 203 and 204, are used. In the exemplary embodiment, for each of the three character kinds, a plurality of characters are prepared. Note that additional characters and auxiliary characters are hereinafter collectively referred to as "sub-characters."

The operational character 201 is controlled by a player in the game with competition. The sub-character is added to the operational character. A sub-character added to an operational character changes the performance of that operational character (e.g., the performance of the operational character is enhanced or a type is given to the operational character). In other words, in the exemplary embodiment, a player adds a sub-character to an operational character to enhance the operational character in the game with competition. In the exemplary embodiment, the game system 1 provides a sub-character that can be added to an operational character, resulting in an improvement in the strategic aspect of the game with competition.

In the exemplary embodiment, sub-characters include two kinds of characters, additional characters and auxiliary characters. As shown in FIG. 8, the additional character 202 can be directly added to the operational character 201. Note that in the exemplary embodiment, it is assumed that only one additional character can be added to an operational character. Alternatively, in another exemplary embodiment, two or more additional characters may be allowed to be added to an operational character. The auxiliary characters 203 and 204 can be combined with the additional character 202. Thus, while the additional character 202 can be directly added to the operational character 201, the auxiliary characters 203 and 204 can be indirectly added to the operational character 201.

(Information set for Additional Character)

In the exemplary embodiment, each additional character used in the game with competition is associated with the following pieces of information.

Name

Image representing the additional character

Additional effect

Overall power

Type

Group

Slot capacity

Experience point

Level

Note that in another exemplary embodiment, each additional character may be associated with other information in addition to the above pieces of information, or may not be associated with a portion of the above pieces of information.

The additional-effect information indicates an effect that is given to the performance of an operational character if an additional character is added to the operational character. In the exemplary embodiment, for each additional character, an offensive power parameter for increasing the offensive power of an operational character and a defensive power parameter for increasing the defensive power of an operational character are set as the additional-effect information. Note that the additional-effect information is not limited to the above parameters, and may be other information. For example, for each additional character, skill information of a skill to be given to an operational character may be set as the additional-effect information.

The above type information indicates a type that is given to an operational character if an additional character is added to the operational character. In the exemplary embodiment, the type information indicates one of three types A-C having a trilemma relationship and a type D without advantage and disadvantage in relation to the three types A-C. Note that the type A is advantageous over the type B, the type B is advantageous over the type C, and the type C is advantageous over the type A. As described in detail below, if the type of a first operational character is advantageous over the type of a second operational character, the offense of the first operational character can cause a greater damage to the second operational character in the game with competition than if the first operational character does not have such an advantageous type. In this case, the first operational character may be less damaged by the offense of the second operational character than if the first operational character does not have such a superior advantageous type. Note that in another exemplary embodiment, the type is not limited to the above four types. For example, the number of types may not be limited, and a type without advantage and disadvantage in relation to the other type may not be included.

The overall power is an index indicating the overall strength of an effect that is given by an additional character. For example, the overall power has a value that is determined based on an additional effect (specifically, offensive power and defensive power) given by an additional character. The overall power is used by a player for roughly determining the strength of an additional character.

The group information indicates a group to which an additional character belongs. Here, in the exemplary embodiment, operational characters and sub-characters are each divided into one or more groups. Note that operational characters or sub-characters may be divided in any suitable manner. For example, when a character appearing in another game application (i.e., a game application different from the game application of the game with competition) is used as an operational character in the game with competition, characters may be divided into groups according to game applications (or series of game applications) in which characters appear.

Note that in the exemplary embodiment, groups of operational characters and groups of sub-characters are managed as different kinds of groups because operational characters and sub-characters are different kinds of characters. Each group of operational characters is associated with one of the groups of sub-characters. The groups of operational characters may be associated with the groups of sub-characters in any suitable manner. For example, a group of operational characters is associated with a group of sub-characters that appear in the same game application in which those operational characters appear (note that a group of operational characters and an associated group of sub-characters can be said to be substantially the same group). As described in detail below, in the exemplary embodiment, in the case where the group of an operational character is associated with the group of a sub-character added to the operational character, the performance of the operational character is further enhanced than if the group of the operational character is not associated with the group of the sub-character.

The slot capacity information indicates a capacity in which an auxiliary character or characters can be combined with an additional character, i.e. the maximum amount of an auxiliary character or characters that can be combined with an additional character. The number of slots is described in detail below.

The experience point information indicates a current experience point of an additional character. The level information indicates a current level of a sub-character. Here, in the game with competition, if the experience point of an additional character has reached a predetermined value, the level of the additional character is increased by one. When the level is increased, the additional-effect information is updated such that a greater effect is given to an operational character.

(Information set for Auxiliary Character)

In the exemplary embodiment, each auxiliary character used in the game with competition is associated with the following pieces of information.

Name

Image representing the auxiliary character

Additional effect

Group

Number of slots to be occupied

Note that in another exemplary embodiment, each auxiliary character may be associated with other information in addition to the above pieces of information, or may not be associated with a portion of the above pieces of information. For example, each auxiliary character may be associated with information similar to those for additional characters.

The additional-effect information indicates an effect that is given to an operational character to which an additional character is added if an auxiliary character is combined with the additional character. In other words, more effects can be given to an operational character by combining an auxiliary character with an additional character in addition to simply adding the additional character to the operational character.

In the exemplary embodiment, an additional effect set for an auxiliary character is a skill that is given to an operational character. The skill may be any suitable effect, such as the effect of enhancing the power of a punch or the effect of using a specific item. Note that additional characters and auxiliary characters may have either the same or different additional effects (e.g., additional characters and auxiliary characters may both give the effect of increasing offensive power).

The number-of-slots-to-be-occupied information indicates the capacity (i.e., the slot capacity) of an additional character that is occupied when an auxiliary character is combined with the additional character. In the exemplary embodiment, one or more auxiliary characters can be combined with an additional character, provided that the sum of the numbers of slots occupied by the auxiliary characters is smaller than or equal to the set slot capacity of the additional character. For example, as shown in FIG. 8, if the slot capacity of the additional character 202 is "3," the number of slots to be occupied by the auxiliary character 203 is "1," and the number of slots to be occupied by the auxiliary character 204 is "2," the two auxiliary characters 203 and 204 can simultaneously be combined with the additional character 202. Although not shown, three auxiliary characters for each of which the number of slots to be occupied is "1" can simultaneously be combined with the additional character 202 having a slot capacity of "3." Although, in the exemplary embodiment, different numbers of slots are to be occupied by different auxiliary characters, the same number of slots may be occupied by each auxiliary character in another exemplary embodiment.

As described above, in the exemplary embodiment, a sub-character can be added to an operational character used in the game with competition. A player can select a combination of an operational character and a sub-character(s). Therefore, the strategic aspect of the game with competition can be further improved than when an operational character is simply selected. In addition, in the exemplary embodiment, two kinds of characters, additional characters and auxiliary characters, are used as sub-characters. Therefore, an increased variety of combinations of characters can be added to an operational character, resulting in a further improvement in strategic aspect.

[2-2. Preparation of Set of Sub-Characters]

Next, a process of preparing a set of sub-characters will be described. In the exemplary embodiment, a player can prepare sets of an additional characters and an auxiliary character(s) combined with the additional character. The game system 1 stores the prepared sets. In order to add sub-characters to an operational character used in the game with competition (i.e., in a character selection screen shown in FIG. 9), the game system 1 selects one from the stored sets to select sub-characters that are to be added to the operational character. The set preparation process will now be described.

Figure 9:
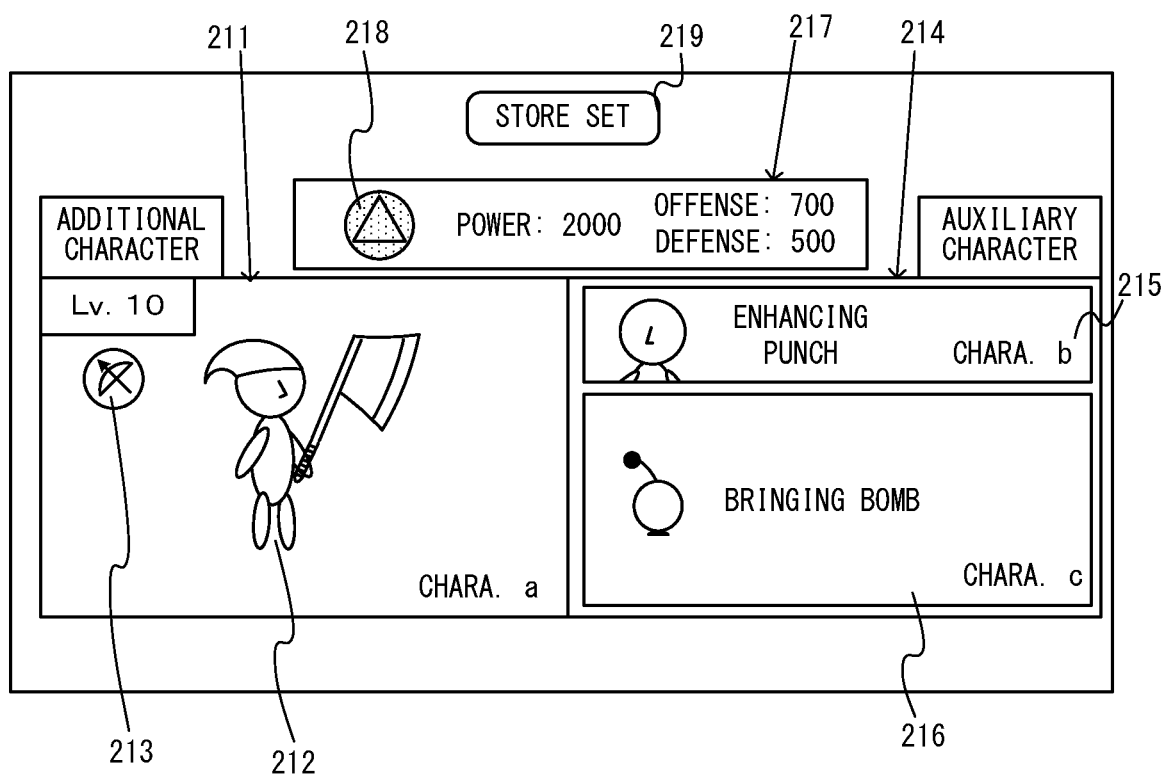
FIG. 9 is a diagram showing an example of a non-limiting set preparation screen.

FIG. 9 is a diagram showing an example of a set preparation screen. The set preparation process may be executed at any suitable timing during execution of a game application in the game with competition. In the exemplary embodiment, during execution of the game application, the set preparation process is started in response to a predetermined set preparation instruction given by a player. At the start of the set preparation process, the game system 1 displays a set preparation screen on a display device (specifically, either the display 12 or the above stationary monitor).

As shown in FIG. 9, the set preparation screen includes an additional character setting region 211. In the additional character setting region 211, information about a selected additional character is displayed. Specifically, the game system 1 displays the following pieces of information in the additional character setting region 211.

Image 212 showing a selected additional character

Name of the additional character ("Chara. a" in FIG. 9)

Current level of the additional character ("Lv. 10" in FIG. 9)

Group icon 213 indicating a group to which the additional character belongs

In the exemplary embodiment, a player is allowed to perform an operation of selecting an additional character, by activating the additional character setting region 211. Note that in the exemplary embodiment, an element (i.e., an image or a region) displayed on the screen of the display device may be activated in any suitable manner. For example, an element may be activated by performing an input on the touch panel 13 or by performing a button input on a controller with a cursor pointing the element on the screen.

Specifically, in the exemplary embodiment, in response to an input for activating the additional character setting region 211, the game system 1 displays, on the display device, a selection screen (not shown) including candidates for an additional character to be selected. For example, the selection screen displays a list of candidates for an additional character to be selected, together with pieces of information (a name, an additional effect, a type, etc.) about each additional character candidate. A player specifies one of the candidates for an additional character to be selected that are included in the selection screen to select an additional character. After an additional character is selected in the selection screen, the game system 1 changes the display of the display device from the selection screen to the set preparation screen. After the display is changed, the additional character setting region 211 in the set preparation screen displays pieces of information about the selected additional character (see FIG. 9). Note that when a player activates the additional character setting region 211, in which the selected additional character is being displayed, the player is allowed to select a different additional character (in other words, reselect an additional character).

As shown in FIG. 9, the set preparation screen includes an auxiliary character setting region 214. The auxiliary character setting region 214 displays pieces of information about one or more selected auxiliary characters. Specifically, the game system 1 displays the following pieces of information about each auxiliary character in the auxiliary character setting region 214.

Image of the selected auxiliary character

Name of the auxiliary character ("Chara. b" and "Chara. c" in FIG. 9) Additional effect given by the auxiliary character (specifically, the effect of a skill: "enhancing punch" and "bringing a bomb" in FIG. 9)

The auxiliary character setting region 214 may also display information about a plurality of auxiliary characters. In the example of FIG. 9, there are two selected auxiliary characters, and the auxiliary character setting region 214 includes a region 215 in which information about an auxiliary character having the name "Chara. b" is displayed, and a region 216 in which information about an auxiliary character having the name "Chara. c" is displayed. Note that a region for an auxiliary character in the auxiliary character setting region 214 has a size corresponding to the number of slots to be occupied by the auxiliary character. In the example of FIG. 9, it is assumed that the number of slots to be occupied by the auxiliary character having the name "Chara. b" is "1," and the number of slots to be occupied by the auxiliary character having the name "Chara. c" is "2." Therefore, the region 216 has a display size that is two times as large as that of the region 215. Thus, the number of slots to be occupied by each auxiliary character can be shown to a player in an easy-to-understand manner. Note that the additional character setting region 211 may have a display size corresponding to the slot capacity of an additional character. As a result, a relationship between the slot capacity of an additional character and the number of slots to be occupied by each auxiliary character can be shown to a player in an easy-to-understand manner.

In the exemplary embodiment, a player is allowed to select an auxiliary character by activating the auxiliary character setting region 214. Specifically, in response to an input for activating the auxiliary character setting region 214, the game system 1 displays, on the display device, a selection screen (not shown) including candidates for an auxiliary character to be selected. For example, the selection screen displays a list of candidates for an auxiliary character to be selected, together with pieces of information (name, additional effect, etc.) about each auxiliary character candidate. A player specifies one of the selection candidates in the selection screen to select an auxiliary character. After an auxiliary character is selected in the selection screen, the game system 1 changes the display of the display device from the selection screen to the set preparation screen. After the display is changed, information about the selected auxiliary character is displayed in the auxiliary character setting region 214 in the set preparation screen (see FIG. 9). Note that a player is allowed to select an additional auxiliary character by activating the auxiliary character setting region 214 displaying the information about the selected auxiliary character.

Note that in the set preparation process, the game system 1 prepares a set of an additional character and one or more auxiliary characters combined with the additional character, provided that the amount of the auxiliary characters is smaller than or equal to the slot capacity of the additional character. Specifically, if the sum of the numbers of slots to be occupied by the selected auxiliary characters is greater than the slot capacity of the additional character, the game system 1 does not prepare a set of the additional character and the auxiliary characters (in other words, such a set is forbidden). Specifically, in the set preparation process, if the sum of the numbers of slots to be occupied by the selected auxiliary characters exceeds the slot capacity of the selected additional character by selecting a new auxiliary character, the game system 1 may forbid selection of such a new auxiliary character in the selection screen. Alternatively, for example, in the above case, the game system 1 may not accept an instruction to store a set as described below. In the exemplary embodiment, because a condition for preparation of a set is provided using slots as described above, the strategic aspect of the set preparation can be improved, resulting in a further improvement in the strategic aspect of the game with competition.

As shown in FIG. 9, the set preparation screen includes an additional effect region 217. In the additional effect region 217, information of effects to be given to an operational character by a set of selected sub-characters is displayed. Specifically, in the additional effect region 217, a type mark 218 indicating a type (i.e., the type of a selected additional character) to be given to an operational character is displayed. In the additional effect region 217, the offensive and defensive power parameters for improving the performance of an operational character are also displayed. Note that the offensive and defensive power parameters are included in the additional-effect information of an additional character. In the additional effect region 217, information of an overall power is also displayed. As the overall power displayed in the additional effect region 217, an overall power associated with an additional character may be displayed directly or after being corrected based on an additional effect by the selected auxiliary character.

As described above, in the exemplary embodiment, the additional effect of an additional character and the additional effect of an auxiliary character are displayed in the set preparation screen. This allows a player to know the effect of a set of a selected additional character and auxiliary character. Therefore, a player can easily prepare such a set. In addition, in the exemplary embodiment, an index (i.e., overall power) based on the additional effect of an additional character (and the additional effect of an auxiliary character) is displayed in the set preparation screen. This allows showing of an easy-to-understand reference for preparing a set to a player. Therefore, a player can easily prepare a set.

As shown in FIG. 9, the set preparation screen includes a storage instruction image 219. The storage instruction image 219 allows a player to provide a set storage instruction to store a set of a selected additional character and auxiliary character (i.e., a set of an additional character and an auxiliary character displayed in the set preparation screen). Specifically, the game system 1 stores a set of a selected additional character and auxiliary character in response to an input of activation of the storage instruction image 219. At this time, the game system 1 may receive, from a player, a name that is to be given to the stored set.

Note that a set prepared in the set preparation process may not include an auxiliary character. In other words, a set of sub-characters may include only an additional character without an auxiliary character.

As described above, in the exemplary embodiment, a player can previously store (in other words, register) a set of an additional character and an auxiliary character before the start of the game with competition. As described in detail below, when a player selects an operational character and a sub-character before the game with competition, the player can specify a sub-character(s) to be added to the operational character by selecting one of the stored sets. Thus, a player can easily perform an operation of specifying a sub-character to be used in the game with competition.

[2-3. Character Selection Process]

Next, a character selection process of selecting a character that is to be used in the game with competition will be described. In the exemplary embodiment, the game system 1 executes the character selection process before starting the game with competition. The character selection process includes an operational character selection process of selecting an operational character, and a sub-character selection process of selecting a sub-character. Specifically, before starting the game with competition, a player selects an operational character that is to be used by themselves, and a sub-character that is to be added to the operational character. In the exemplary embodiment, in the character selection process, the game system 1 displays, on the display device, a character selection screen for selecting an operational character and a sub-character. The character selection screen is an image serving as a user interface for allowing each player to select characters.

Figure 10:
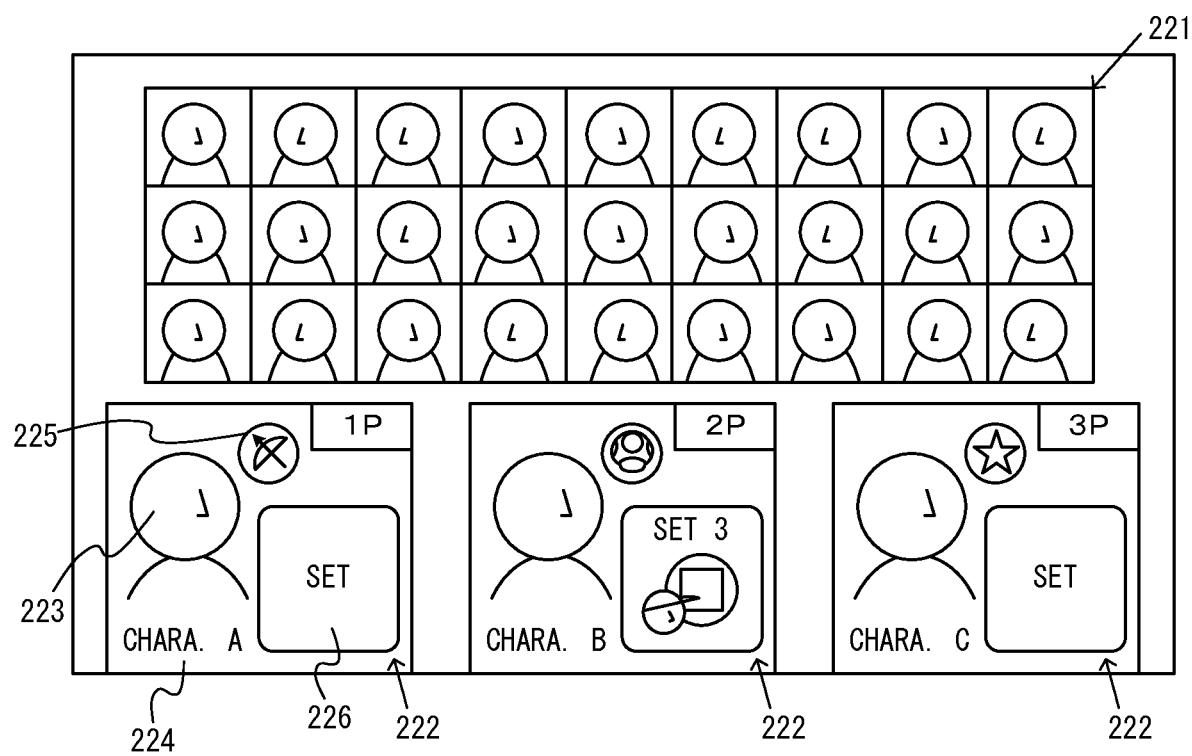
FIG. 10 is a diagram showing an example of a non-limiting character selection screen.

FIG. 10 is a diagram showing an example of the character selection screen. As shown in FIG. 10, the character selection screen includes an operational character candidate image 221. The operational character candidate image 221 indicates a plurality of (here, 27) operational characters as candidates for an operational character to be selected. A player specifies one of the selection candidates indicated by the operational character candidate image 221 to select an operational character to be used.

In the character selection process, the game system 1 executes the operational character selection process of selecting an operational character. Specifically, the game system 1 receives a player's input for specifying one of a plurality of candidates for an operational character to be selected. The game system 1 also selects the operational character specified by the player as an operational character to be used by the player (in other words, as a selected operational character).

As shown in FIG. 10, the character selection screen includes a player region 222 provided for each player. Note that in FIG. 10, it is assumed that three players participate in the game with competition, and therefore, three player regions 222 are displayed. Each player region 222 is associated with a selected operational character and a sub-character(s) for a player.

As shown in FIG. 10, in each player region 222, an image of an operational character selected by a player is displayed. Specifically, in each player region 222, an image 223 showing a selected operational character and an image 224 showing the name of the operational character are displayed as the image of the selected operational character. Note that FIG. 10 shows operational characters selected by the three players. If there is not a selected operational character, none of the images 223 and 224 is displayed in the player region 222, and an image showing that an operational character has not been selected is displayed.

In each player region 222, a group icon 225 is displayed (see FIG. 10). The group icon 225 is an image of a group to which a selected operational character belongs. This allows a player to easily recognize a group to which a selected operational character belongs. As described above, in the exemplary embodiment, if the group of an operational character corresponds to the group of a sub-character, the performance of the operational character is further improved than if there is not such a correspondence. Therefore, because a player takes the group of an operational character into account when selecting a sub-character that is to be added to the operational character, the group icon 225 makes it easier for a player to select a sub-character.

As shown in FIG. 10, each player region 222 includes a sub-character region. In the sub-character region, information about a sub-character added to a selected operational character is displayed. Note that a sub-character region 226 shown in FIG. 10 indicates that there is not a selected sub-character.

In the exemplary embodiment, in the character selection screen, a player selects one of the stored sets of sub-characters (i.e., sets of an additional character and an auxiliary character(s)) to set a set of sub-characters.

Figure 11:
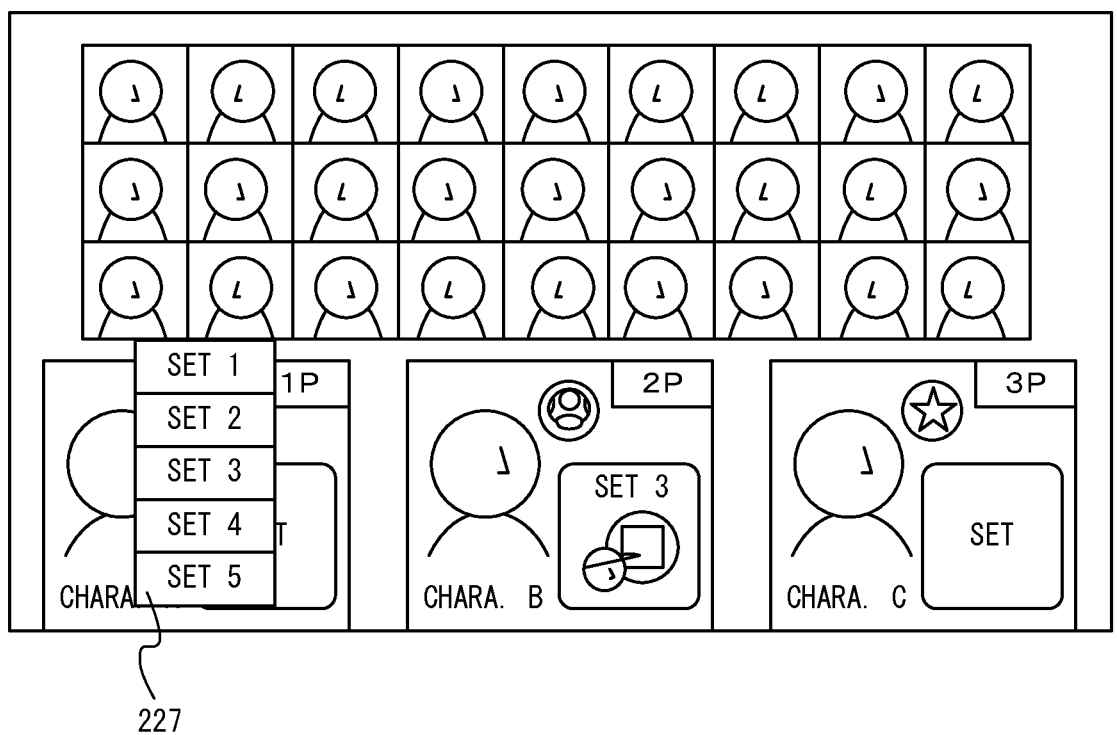
FIG. 11 is a diagram showing an example of a non-limiting character selection screen after a sub-character region is activated by a player.

FIG. 11 is a diagram showing an example of the character selection screen after a sub-character region is activated by a player. As shown in FIG. 11, when a player activates the sub-character region 226, the game system 1 displays a set candidate image 227 at or near the sub-character region 226. In the exemplary embodiment, the set candidate image 227 related to a player is displayed without overlaying the player regions of the other players (in other words, without hiding the player regions of the other players). The set candidate image 227 is also displayed without overlaying the operational character candidate image 221.

The set candidate image 227 indicates one or more stored sets (in the example of FIG. 11, the names of the sets, such as "set 1"). Note that the set candidate image 227 may show either all or a portion of the stored sets. When the set candidate image 227 shows only a portion of the stored sets, the game system 1 may change sets shown in the set candidate image 227 according to a player's instruction.

While the set candidate image 227 is being displayed, the game system 1 executes the sub-character selection process of selecting a sub-character. Specifically, the game system 1 receives a player's input for specifying one of a plurality of candidates for a sub-character to be selected (in other words, a set of sub-characters to be selected). Specifically, the game system 1 receives a player's input for specifying one of the sets indicated by the set candidate image 227. When the above input has been performed, the game system 1 selects the specified set (in other words, the selected set), and displays information about the selected set in the sub-character region 226.

As described above, in the exemplary embodiment, the game system 1 stores additional characters (in the exemplary embodiment, sets each including an additional character) that are previously specified by a player from a plurality of additional characters, as candidates for an additional character to be selected (the above set preparation process). Thereafter, in the sub-character selection process, the game system 1 selects one from the additional characters (in the exemplary embodiment, the sets each including an additional character) stored as the selection candidates. As described above, an additional character to be used in the game with competition is selected from the selection candidates (i.e., sets) previously prepared by a player. Therefore, the strategic aspect of the game with competition, such as taking an advantage position, is affected by the effects of the selection candidates. Therefore, the strategic aspect of the game with competition is affected by the effects of the previously prepared selection candidates as described above, resulting in a further improvement in the strategic aspect of the game with competition. In addition, according to the above feature, the operation of selecting a sub-character in the character selection process can be facilitated.

Note that in another exemplary embodiment, the game system 1 may select an additional character and an auxiliary character separately (instead of selecting the above set) in the character selection process. For example, in the character selection screen, when a player activates the sub-character region 226, the game system 1 may receive a player's input for specifying an additional character, and also receive a player's input for specifying an auxiliary character, as in the above set preparation process.

Figure 12:
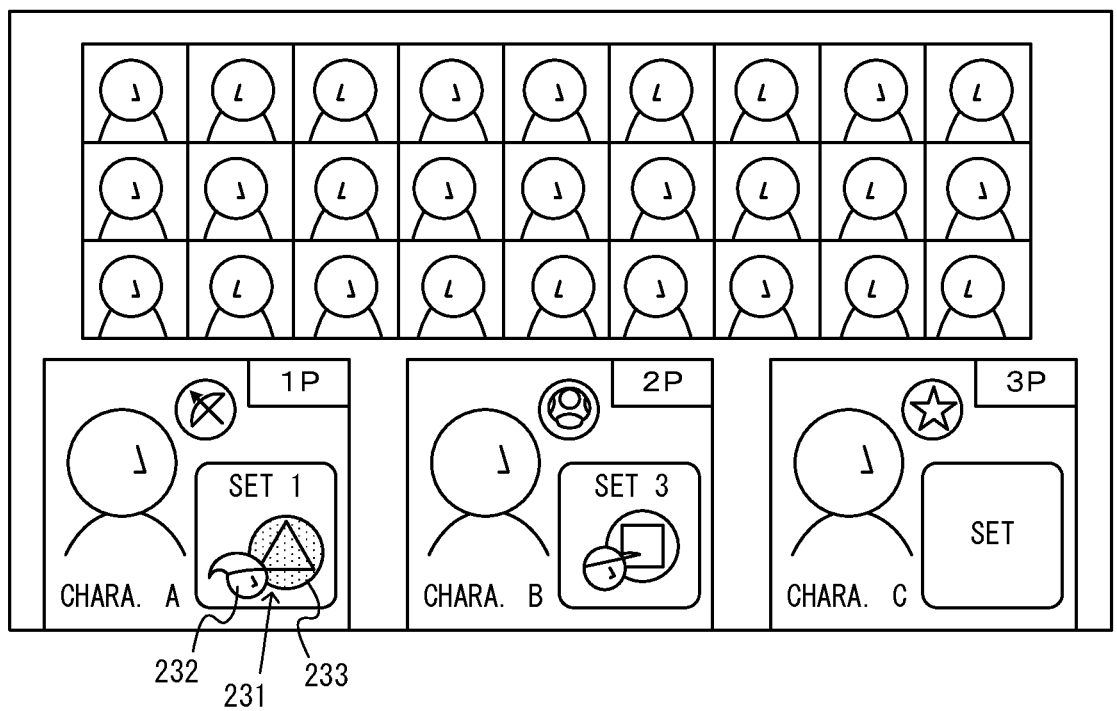
FIG. 12 is a diagram showing an example of a non-limiting character selection screen in the case where a set of sub-characters has been selected.

FIG. 12 is a diagram showing an example of the character selection screen in the case where a set of sub-characters has been selected. Note that FIG. 12 shows that a set of sub-characters has been selected for a player denoted by "1P" in the character selection screen. As shown in FIG. 12, when a set of sub-characters has been selected, an image related to a selected additional character (i.e., an additional character included in the selected set) is displayed in the sub-character region 226. In the exemplary embodiment, an additional character icon 231 is displayed as an image related to the selected additional character. The additional character icon 231 includes an image 232 showing the additional character, and an image 233 showing the type of the additional character. Therefore, by viewing the additional character icon 231, a player can know the selected additional character and its type, which are information useful for selection of a sub-character. Note that in the exemplary embodiment, while a certain player is performing the sub-character selection process of selecting a sub-character (FIG. 11), the additional character icon 231 is being displayed in the player regions of the other players. Therefore, a player can select a sub-character while checking additional characters selected by the other players and their types.

Note that in another exemplary embodiment, information about an auxiliary character may be displayed in addition to information about an additional character in the sub-character region 226. For example, an image of a selected auxiliary character may be displayed in the sub-character region 226, or an image of the skill of a selected auxiliary character may be displayed in the sub-character region 226.

As described above, in the exemplary embodiment, the game system 1 generates, in the operational character selection process and the sub-character selection process, an image including at least an image of an operational character selected by each player participating in the game with competition (the image 223 of FIG. 10), an image of an additional character selected by the player (the image 232 of FIG. 12), and an image of the type of the additional character (the image 233 of FIG. 12). Thus, an operational character and additional character selected by each player and the type of the additional character are shown. This allows each player to select a character to be used by themselves while referring to operational characters and additional characters selected by the other players. Therefore, according to the exemplary embodiment, tactics can be used to select a character in the game with competition, resulting in an improvement in the amusingness of the game with competition.

Note that the above phrase "generate an image in the operational character selection process and the sub-character selection process" means that an image is generated in the operational character selection process, and an image is generated in the sub-character selection process. In the exemplary embodiment, the operational character selection process and the sub-character selection process may be executed in parallel. Alternatively, the phrase "in the operational character selection process and the sub-character selection process" means that the operational character selection process and the sub-character selection process may also be executed at separate timings instead of being executed in parallel.

Here, it is assumed that at least one piece of information (e.g., only the image 233 showing the type of an additional character) is displayed as information about a sub-character in the sub-character region 226. In this case, each player may consider to select an additional character having a type that is advantageous over the type of an additional character selected by another player, or an additional character that provides an additional effect that is advantageous over the additional effect of an additional character selected by another player. Therefore, in the above case, each player may more frequently reselect an additional character after another player selects an additional character. As a result, the game with competition is likely to take a long time to start.

In contrast to this, in the exemplary embodiment, the game system 1 displays information with which an additional effect can be guessed (i.e., information about an additional character), and information about advantage and disadvantage (i.e., information about a type), i.e. two pieces of information of different properties. As a result, a player determines whether an additional character selected by another player is advantageous or disadvantageous, based on a plurality of additional factors, instead of based on only the advantage and disadvantage. Therefore, a player may stop reselecting an additional character for themselves based on another player's selection when the player considers that the selected additional character is advantageous to some extent. Therefore, according to the exemplary embodiment, tactics can be used to select a character in the game with competition, and the selection can be smoothly completed.

In the character selection screen, after a player selects an operational character and a sub-character, the game system 1 receives a determination instruction from the player. By the determination instruction, each selected character (i.e., the operational character and the sub-character) is determined as a character to be used by the player in the game with competition. After all players have given a determination instruction, the game system 1 ends the character selection process, and starts the game with competition. Note that the game system 1 ends the character selection process under any suitable condition. For example, the game system 1 may end the character selection process if a predetermined period of time has elapsed from the start of the character selection process, or if a predetermined single player has given a game start instruction.

Note that in the character selection process, the game system 1 may receive an instruction input from at least one of a plurality of players participating in the game with competition. For example, in the case where the game system 1 communicates with other game systems so that the game with competition is played in a plurality of game systems (e.g., the game with competition is played via communication), the game system 1 may receive an instruction input from a single player, and information about another player from another game system. Note that the "information about another player" may be information of an instruction input provided by that player, or information about a character selected by that player. In this case, the game system 1 updates and displays the player region 222 in the character selection screen, based on information received from another game system.

As described above, in the exemplary embodiment, the character selection process can be executed in either an embodiment in which a plurality of players use a single game system 1 to play the game with competition or an embodiment in which each player uses their own single game system 1 to play the game with competition. Note that in both of the above embodiments, a plurality of player regions 222 related to a plurality of players participating in the game with competition are displayed on the character selection screen. Therefore, in both of the above embodiments, a player can view information about the other players during the character selection process.

[2-4. Process of Game with Competition]

Next, a process of the game with competition executed in the game with competition will be described. The process of the game with competition is for executing the game with competition while controlling operational characters selected by the operational character selection process in a virtual space according to a player's operational input. In the exemplary embodiment, the process of the game with competition is executed after the end of the character selection process (specifically, following the character selection process). In the process of the game with competition, a screen of the game with competition is displayed on the display device. The process of the game with competition will now be described in detail.

Figure 13:
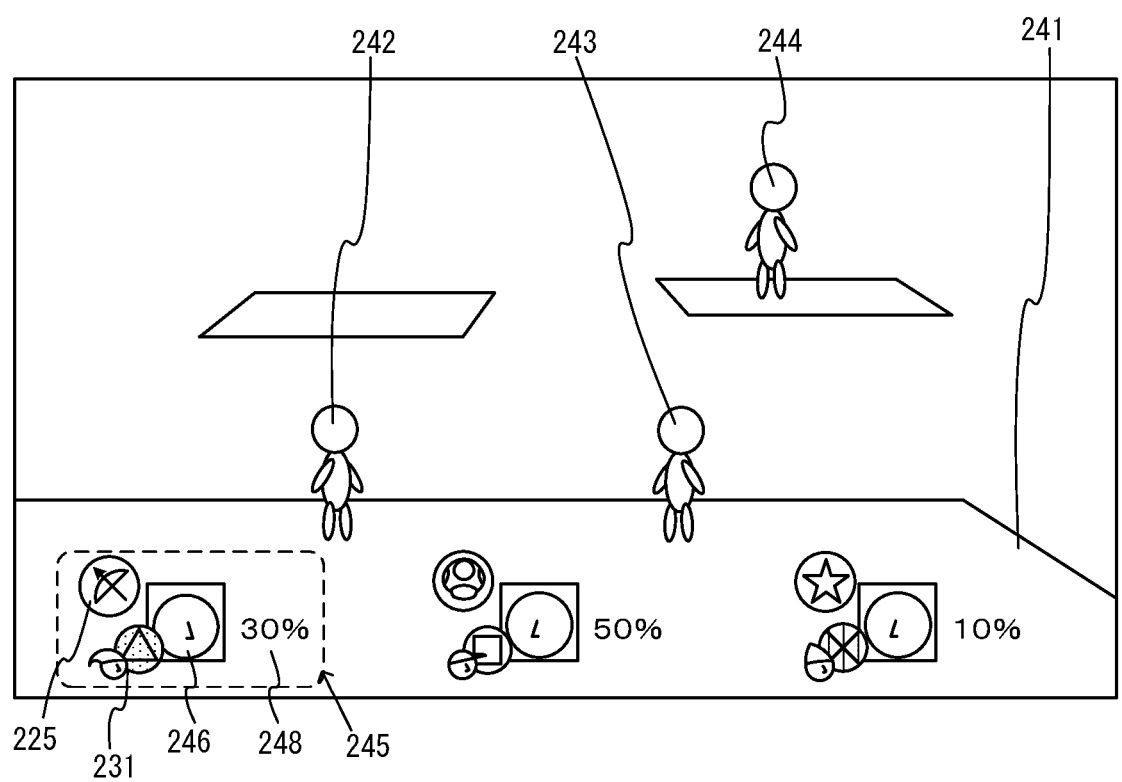
FIG. 13 is a diagram showing an example of a non-limiting screen of a game with competition.

FIG. 13 is a diagram showing an example of the screen of the game with competition. As shown in FIG. 13, the screen of the game with competition includes an image 241 showing a virtual space, and images 242-244 showing operational characters disposed in the virtual space. Note that in the exemplary embodiment, it is assumed that the game system 1 does not dispose a sub-character in the virtual space. In another exemplary embodiment, a sub-character may be disposed in the virtual space.

In the exemplary embodiment, the game system 1 executes a fighting game in the process of the game with competition. The process of the game with competition is executed based on the performances of operational characters that are each given an effect associated with a sub-character selected by the sub-character selection process, and advantage and disadvantage associated with the types of additional characters included in the sub-characters. Specifically, in the fighting game, when a first operational character attacks a second operational character, the game system 1 determines the amount of damage to the second operational character caused by the first operational character's attack, based on the following (a) and (b):

(a) the performances of the first and second operational characters; and (b) the advantage and disadvantage between the type of an additional character added to the first operational character and the type of an additional character added to the second operational character.

Concerning (a), the game system 1 increases the offensive power of the first operational character based on the additional effect of an additional character, increases the defensive power of the second operational character based on the additional effect of an additional character, and calculates the amount of damage based on the increased offensive power and defensive power. Concerning (b), if there is an advantage and disadvantage relationship indicating that the type for the first operational character is advantageous over the type for the second operational character, the game system 1 increases the amount of damage more than if there is not such an advantage and disadvantage relationship. Meanwhile, if there is an advantage and disadvantage relationship indicating that the type for the first operational character is disadvantageous in relation to the type for the second operational character, the game system 1 decreases the amount of damage more than if there is not such an advantage and disadvantage relationship.

Also, concerning (a), in the exemplary embodiment, if a group to which an operational character belongs corresponds to a group to which an additional character belongs, the game system 1 increases the additional effect of the additional character more than if there is not such a correspondence. For example, if a group to which an operational character belongs corresponds to a group to which an additional character belongs, the amount of an increase in offensive power and defensive power caused by the additional character is set greater than if there is not such a correspondence. Thus, by changing the additional effect, depending on whether or not there is a group correspondence, the strategic aspect of the game can be further improved. Note that in another exemplary embodiment, the game system 1 may change the additional effect of an additional character, based on the group of an auxiliary character in addition to the groups of an operational character and the additional character.

Note that, as described above, in the exemplary embodiment, characters appear in other game applications (i.e., game applications other than the game application of the game with competition), and characters are divided into groups for each game application or each series of game applications. Therefore, if a player knows other game applications, the player can prepare an advantageous combination of an operational character and an additional character, resulting in an increase in the amusingness of the game. In addition, because grouping is performed for each of other game applications, a player can easily understand a correspondence between a group to which an operational character belongs and a group to which an additional character belongs.

In the exemplary embodiment, if an additional character is combined with an auxiliary character, the additional effect of the auxiliary character is given to an operational character. For example, if an additional character is combined with an auxiliary character having a skill "enhancing a punch" (i.e., an additional effect), the game system 1 increases the power of a punch of an operational character to which the additional character is added. As described above, if an additional character added to an operational character is combined with an auxiliary character, the game system 1 executes the process of the game with competition based on the performance of the operational character given the effect of the additional character as well as the effect of the auxiliary character. As a result, an operational character can be given the effects of two kinds of sub-characters combined together, so that an increased variety of additional effects can be provided, resulting in a further improvement in the strategic aspect of the game.

As shown in FIG. 13, the screen of the game with competition includes a player display region (e.g., a region 245 in FIG. 13) for each player. Note that in FIG. 13, the boundary of the player display region 245 is indicated by a dashed line, which may not actually be displayed. In each player display region, information about a player's operational character and sub-character(s) are displayed.

In the player display region 245, an image 246 showing an operational character, and the above additional character icon 231 indicating an additional character added to the operational character, are displayed (see FIG. 13). In the exemplary embodiment, the additional character icon 231 is displayed in association with the image 246 showing an operational character. Thus, in the exemplary embodiment, the game system 1 generates, in the game with competition, an image including at least the image 246 showing an operational character, an image of an additional character (i.e., the image 232 included in the additional character icon 231), and an image of the type of the additional character (i.e., the image 233 included in the additional character icon 231). As a result, a player can know, in the game with competition, an additional character added to an operational character and the type of the additional character, which are useful game information.

In addition, as shown in FIG. 13, the group icon 225 indicating a group to which the operational character belongs is displayed in the player display region 245. Therefore, in the exemplary embodiment, a player can easily understand, in the game with competition, whether or not a group to which an operational character belongs corresponds to a group to which an additional character belongs.

In addition, an image 248 showing a current state of the operational character is displayed in the player display region 245 (see FIG. 13). Specifically, the image 248 shows the amount of damage to the operational character. Note that in another exemplary embodiment, for example, a numerical value or gage indicating the remaining physical strength of an operational character may be displayed as the image of a current state of the operational character.

In another exemplary embodiment, in addition to the information shown in FIG. 13, information about an auxiliary character may be displayed in the player display region 245. For example, an image of a selected auxiliary character may be displayed in the player display region 245, and an image of the skill of the auxiliary character may be displayed in the player display region 245.

The game system 1 ends the game with competition if a condition for ending the game is satisfied. Note that any suitable condition for ending the game is used. For example, the condition for ending the game may be that a predetermined period of time has elapsed from the start of the game with competition, or that the game is over for all players, except one player (specifically, the damage to the operational characters of all players, except one player, is greater than or equal to a predetermined value).

In the exemplary embodiment, after the end of the game with competition, the game system 1 increases the experience point of an additional character used in the game with competition. The amount of an increase in the experience point may be a predetermined amount, or may be determined based on the result of the game with competition (e.g., the win or loss of an operational character to which the additional character is added, or damage which an operational character has caused to another operational character).

If the experience point of an additional character has reached a predetermined value as a result of the increase of the experience point, the game system 1 increases the level of the additional character. The game system 1 also updates a parameter related to the additional character, based on the increase of the level. Specifically, a parameter related to the above additional effect is updated such that a greater effect is given to an operational character (more specifically, the value of the parameter is increased). Thus, in the exemplary embodiment, a player can make an additional character stronger by increasing the level of the additional character. In the exemplary embodiment, even for an additional character that has a small additional effect when the level thereof is low, a player can make the additional character stronger by increasing the level of the additional character by using the additional character in the game with competition. Therefore, the strategic aspect of the game with competition using an additional character can be further improved. In addition, in the exemplary embodiment, by setting a factor (i.e., the level) that increases as the game with competition progresses for an additional character, a player can get the impression that an additional character participates together with an operational character in the game with competition.

Note that the game system 1 may cause an additional character to another additional character (e.g., a stronger additional character) if the level of the original additional character has reached a predetermined value (e.g., an upper limit value). As a result, a player can be strongly motivated to grow an additional character, resulting in a further improvement in the strategic aspect of the game with competition using an additional character.

The parameter of an additional character may be updated under other conditions related to the additional character, instead of the increase of the level. For example, in another exemplary embodiment, the parameter of an additional character may be updated if an item has been used for the additional character. The level of an additional character may be increased if an item has been used for the additional character.

[3. Specific Example of Process in Game System]

Next, a specific example of an information process in the game system 1 will be described with reference to FIGS. 14-17.

[3-1. Data Used in Information Process]

Figure 14:
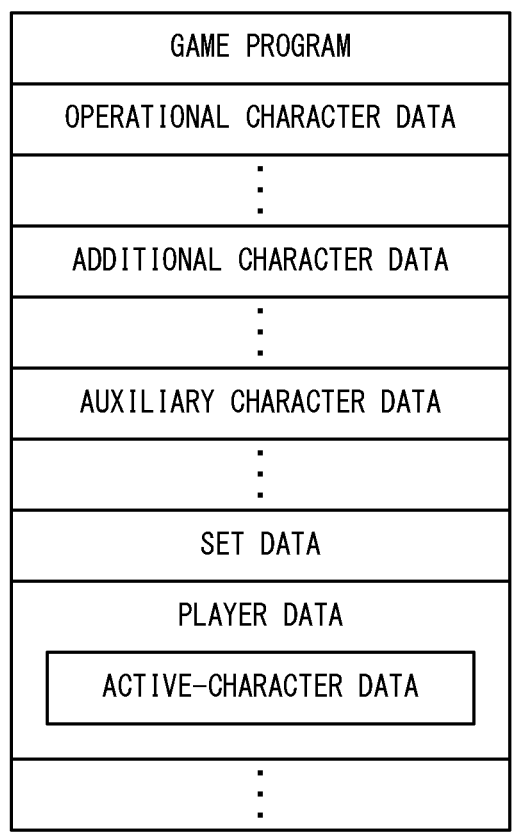
FIG. 14 is a diagram showing an example of various pieces of data used in an information process in a non-limiting game system.

FIG. 14 is a diagram showing an example of various pieces of data used in an information process in the game system 1. The various pieces of information shown in FIG. 14 are stored in a storage medium (e.g., the flash memory 84, the DRAM 85, and/or a memory card inserted in the slot 23) that can be accessed by the main body apparatus 2.

As shown in FIG. 14, the game system 1 stores a game program. The game program is for executing the game with competition in the exemplary embodiment, and is stored in, for example, the flash memory 84, the DRAM 85, and/or a memory card inserted in the slot 23.

As shown in FIG. 14, the game system 1 also stores operational character data, additional character data, and auxiliary character data. These pieces of data may be stored together with the game program in a storage medium.

The operational character data is related to an operational character that is prepared (in other words, can be used) in the game with competition. The operational character data includes data indicating various pieces of information about an operational character (e.g., an image and various parameters related to an operational character). In the exemplary embodiment, a plurality of operational characters are prepared, and the game system 1 stores operational character data for each operational character.

The additional character data is related to an additional character prepared in the game with competition. The additional character data includes data indicating an image and various parameters related to an additional character (i.e., information described in the above section "(Information set for additional character)"). In the exemplary embodiment, a plurality of additional characters are prepared, and the game system 1 stores the additional character data for each additional character.

The auxiliary character data is related to an auxiliary character prepared in the game with competition. The auxiliary character data includes data indicating an image and various parameters related to an auxiliary character (i.e., information described in the above section "(Information set for auxiliary character)"). In the exemplary embodiment, a plurality of auxiliary characters are prepared, and the game system 1 stores the auxiliary character data for each auxiliary character.

As shown in FIG. 14, the game system 1 also includes set data and player data. These pieces of data (in other words, information) are generated in game processes (see FIGS. 15-17) executed in the game program.

The set data indicates a set prepared in the set preparation process. For example, the set data includes, for each prepared set, data indicating identifiers of an additional character and an auxiliary character included in the set.

The player data indicates information about a player in the game with competition. As shown in FIG. 14, the player data includes active-character data indicating characters (i.e., an operational character, an additional character, and an auxiliary character) used by a player. The active-character data includes data indicating the identifiers of characters used by a player. Note that the player data is stored for each player participating in the game with competition.

[3-2. Process Executed in Game System]

(Set Preparation Process)

Figure 15:
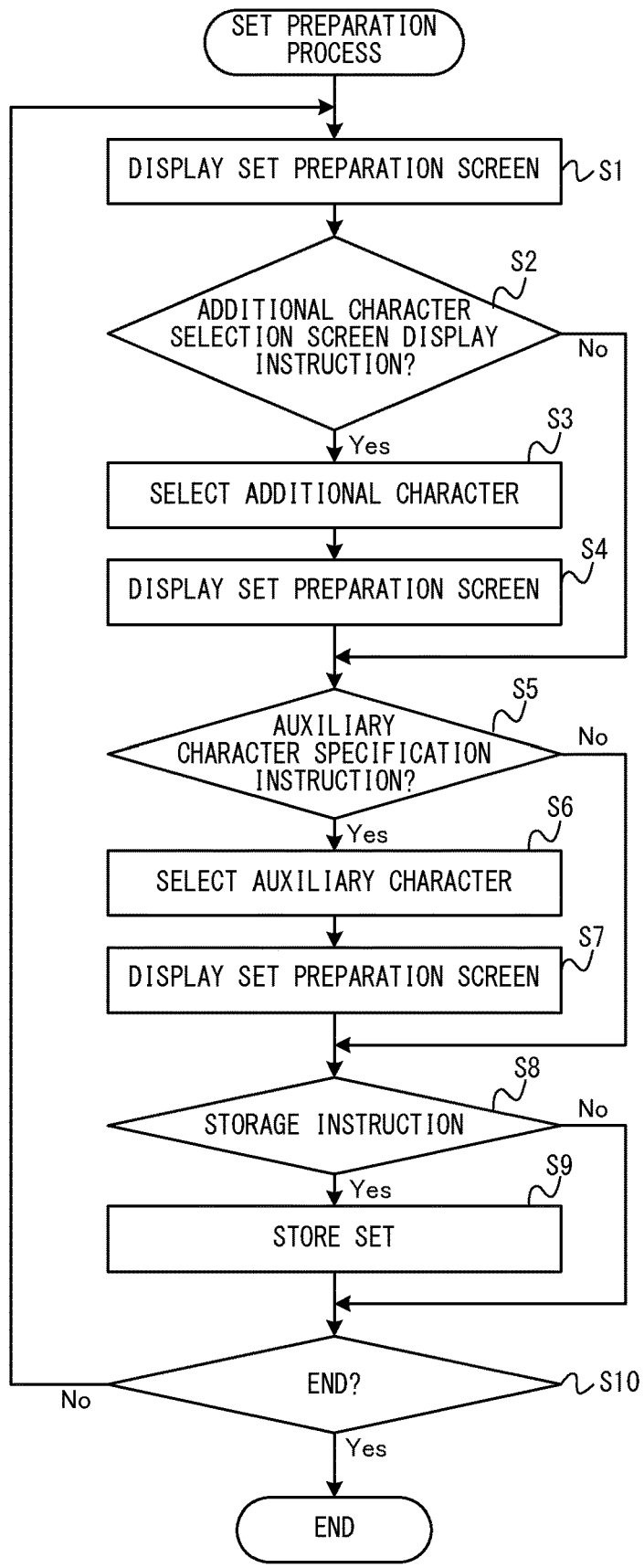
FIG. 15 is a flowchart showing an example of a flow of a set preparation process executed by a non-limiting game system.

FIG. 15 is a flowchart showing an example of a flow of the set preparation process executed by the game system 1. As described above, the set preparation process of FIG. 15 is triggered by a player's predetermined set preparation instruction during execution of the game program.

Figure 16:
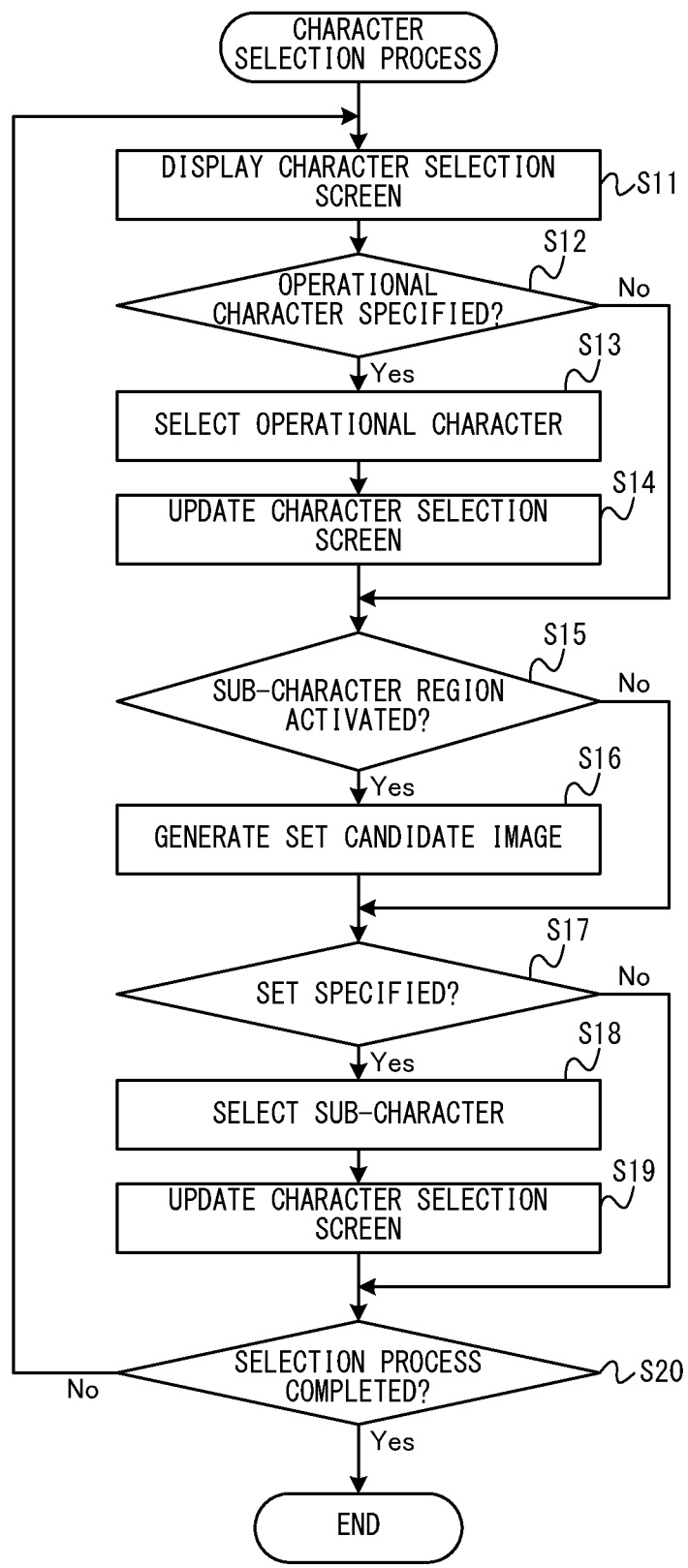
FIG. 16 is a flowchart showing an example of a flow of a character selection process executed by a non-limiting game system.
Figure 17:
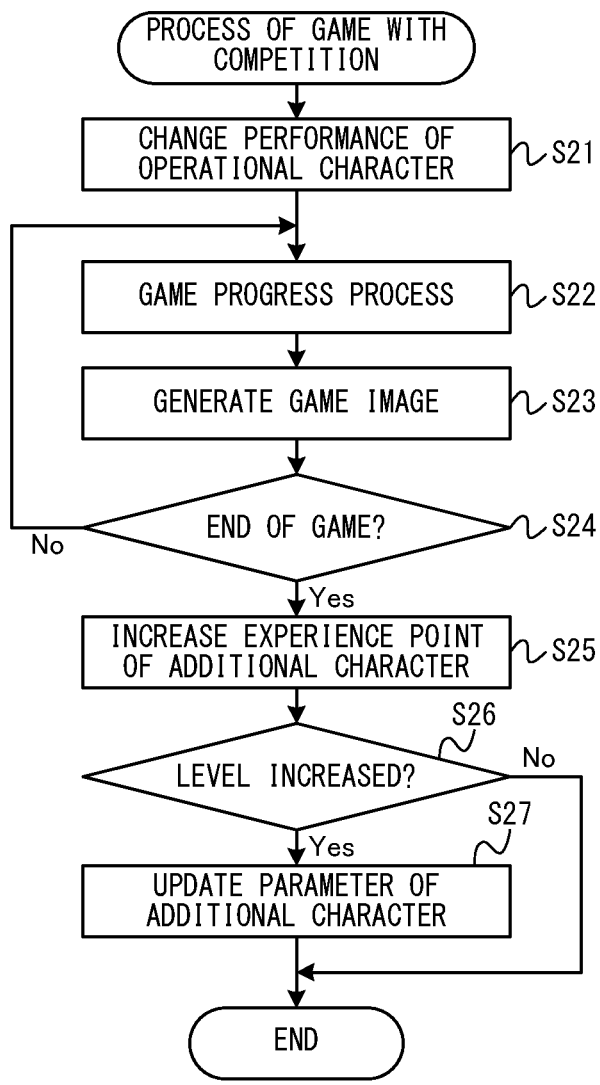
FIG. 17 is a flowchart showing an example of a flow of a process of a game with competition executed by a non-limiting game system.

Note that in the exemplary embodiment, it is assumed that the processor 81 of the main body apparatus 2 executes the game program stored in the game system 1 to execute each step of FIGS. 15-17. Note that in another exemplary embodiment, a portion of the steps may be executed by a processor (e.g., a dedicated circuit) other than the processor 81. In the case where the game system 1 can communicate with another information processing device (e.g., a server), a portion of the steps of FIGS. 15-17 may be executed by the information processing device. The steps of FIGS. 15-17, which are merely for illustrative purposes, may be executed in a different order, or another step may be executed in addition to (or instead of) each step, if a similar effect is obtained.

The processor 81 executes the steps of FIGS. 15-17 using a memory (e.g., the DRAM 85). Specifically, the processor 81 stores information (in other words, data) obtained in each process step into a memory, and reads the information from the memory when the information is required in a subsequent process step.

In step S1 of FIG. 15, the processor 81 causes the display device to display the set preparation screen (see FIG. 9). Note that at the time when the set preparation process is started, an additional character and an auxiliary character have not been selected by a player. Therefore, in step S1, at that time, the processor 81 generates the set preparation screen such that an image indicating that no character has been selected is included in each of the regions 211, 214, and 217 in the set preparation screen. Following step S1, step S2 is executed.

In step S2, the processor 81 determines whether or not a user has given an instruction to display an additional character selection screen. Specifically, the processor 81 determines whether or not a player has given an instruction to activate the additional character setting region 211 in the set preparation screen. Note that in the exemplary embodiment, in order to determine whether or not a player has given such an instruction, the processor 81 obtains, from an input unit (e.g., the touch panel 13, a button, and/or an analog stick) of the game system 1, data indicating an input provided using the input unit. Thereafter, the processor 81 performs the above determination based on the obtained data. If the determination result of step S2 is positive, step S3 is executed. Otherwise, step S5 is executed.

In step S3, the processor 81 selects an additional character according to a player's instruction. Specifically, the processor 81 causes the display device to display a selection screen including candidates for an additional character to be selected, and receives a player's instruction to specify one of the candidates for an additional character to be selected that are included in the selection screen. After the instruction has been given, the processor 81 selects the specified additional character. Following step S3, step S4 is executed.

In step S4, the processor 81 displays the set preparation screen again. Specifically, the processor 81 changes the display of the display device from the above selection screen to the set preparation screen. At this time, the processor 81 generates the set preparation screen in which information about the additional character selected in step S3 is included in the additional character setting region 211 (see the above section "[2-2. Preparation of set of sub-characters]"). Following step S4, step S5 is executed.

In step S5, the processor 81 determines whether or not to display the additional character selection screen. Specifically, the processor 81 determines whether or not a player has given an instruction to activate the auxiliary character setting region 214 in the set preparation screen. If the determination result of step S5 is positive, step S6 is executed. Otherwise, step S8 described below is executed.

In step S6, the processor 81 selects an auxiliary character according to a player's instruction. Specifically, the processor 81 causes the display device to display a selection screen including candidates for an auxiliary character to be selected, and receives a player's instruction to specify one of the candidates for an auxiliary character to be selected that are included in the selection screen. After the instruction has been given, the processor 81 selects the specified auxiliary character. After an auxiliary character has been selected, the processor 81 changes the display of the display device from the above selection screen to the set preparation screen. Following step S6, step S7 is executed.

In step S7, the processor 81 displays the set preparation screen again. Specifically, the processor 81 changes the display of the display device from the above selection screen to the set preparation screen. At this time, the processor 81 generates the set preparation screen in which information about the auxiliary character selected in step S6 is included in the auxiliary character setting region 214 (see the above section "[2-2. Preparation of set of sub-characters]"). Following step S7, step S8 is executed.

In step S8, the processor 81 determines whether or not a player has given a storage instruction. Specifically, the processor 81 determines whether or not the storage instruction image 219 in the set preparation screen has been activated. If the determination result of step S8 is positive, step S9 is executed. Otherwise, step S10 described below is executed.

In step S9, the processor 81 stores a set of a selected additional character and auxiliary character. Specifically, the processor 81 prepares set data indicating the currently selected additional character that has been selected in step S3 and the currently selected auxiliary character that has been selected in step S6, and stores the set data into a storage medium. Following step S9, step S10 is executed.

In step S10, the processor 81 determines whether or not to end the set preparation process. Specifically, the processor 81 determines whether or not a player has given a predetermined end instruction. If the determination result of step S10 is negative, step S1 is executed again. In the exemplary embodiment, a series of steps S1-S10 of the set preparation process is repeated until the determination result of step S10 is positive. If the determination result of step S10 is positive, the processor 81 ends the set preparation process.

(Character Selection Process)

FIG. 16 is a flowchart showing an example of a flow of the character selection process executed by the game system 1. The character selection process of FIG. 16 is triggered by a player's instruction to start a game mode of the game with competition during execution of the game program.

In step S11 shown in FIG. 16, the processor 81 causes the display device to display the character selection screen (see FIG. 10). Note that an operational character and a sub-character have not been selected at the time when the player character selection process is started. Therefore, in step S11 at that time, the processor 81 generates the character selection screen in which an image indicating that a character has not been selected is included in the player region 222. Following step S11, step S12 is executed.

In step S12, the processor 81 determines whether or not a player has given an instruction to specify an operational character. Specifically, the processor 81 determines whether or not a player has given an instruction to specify one of candidates for an operational character to be selected that are shown in the operational character candidate image 221 in the character selection screen. If the determination result of step S12 is positive, step S13 is executed. Otherwise, step S15 described below is executed.

In step S13, the processor 81 selects the operational character specified in step S12. Specifically, the processor 81 generates active-character data including data indicating the specified operational character, and stores player data including the active-character data as player data related to the player who has given that instruction, into a storage medium. As a result, the active-character data indicating the selected operational character is stored. Following step S13, step S14 is executed.

In the exemplary embodiment, steps S12 and S13 correspond to the operational character selection process (i.e., the process of receiving an operational input for specifying one of a plurality of candidates for an operational character to be used by a player in the game with competition, and selecting the operational character according to the operational input).

In step S14, the processor 81 updates the character selection screen such that an image related to the operational character selected in step S13 is included in the character selection screen. Specifically, the processor 81 generates and displays the character selection screen in which an image related to the selected operational character is included in the player region 222 related to the player who has given the instruction. Note that the "image related to the selected operational character" includes the image 223 of the operational character, the image 224 showing the name of the operational character, and the group icon 225 (see FIG. 10). Following step S14, step S15 is executed.

In step S15, the processor 81 determines whether or not a player has given an instruction to activate a sub-character region. If the determination result of step S15 is positive, step S16 is executed. Otherwise, step S16 described below is executed.

In step S16, the processor 81 updates the character selection screen such that the above set candidate image is included in the character selection screen (see FIG. 11). Specifically, the processor 81 generates and displays the character selection screen in which the set candidate image is included in a player region related to the player who has given the instruction in step S15. Note that sets shown by the set candidate image can be specified by referring to the set data stored in the set preparation process. Specifically, the processor 81 generates the set candidate image of one or more sets indicated by the set data, and generates the character selection screen including the set candidate image. Following step S16, step S17 is executed.

In step S17, the processor 81 determines whether or not a player has given an instruction to select a set. Specifically, the processor 81 determines whether or not a player has given an instruction to specify one of the sets included in the set candidate image displayed in step S16. If the determination result of step S17 is positive, step S18 is executed. Otherwise, step S19 described below is executed.

In step S18, the processor 81 selects a sub-character (in other words, a set) specified in step S17. Specifically, the processor 81 generates active-character data including data indicating a sub-character (specifically, an additional character and an auxiliary character) included in the specified set, and stores player data including the active-character data as player data related to the player who has given the instruction into a storage medium. As a result, the active-character data indicating the selected sub-character is stored. Following step S18, step S19 is executed.

In the exemplary embodiment, steps S17 and S18 correspond to the above sub-character selection process (i.e., the process of receiving an operational input for specifying one of a plurality of candidates for an additional character to be selected, and selecting the additional character according to the operational input).

In step S19, the processor 81 updates the character selection screen such that an image related to the sub-character selected in step S18 is included in the character selection screen. Specifically, the processor 81 generates and displays the character selection screen in which an image related to the selected additional character (specifically, an additional character icon) is included in the player region 222 related to the player (see FIG. 12). Following step S19, step S20 is executed.

In step S20, the processor 81 determines whether or not the character selection has been completed for each player. Specifically, the processor 81 determines whether or not each player has given the above determination instruction. If the determination result of step S20 is negative, step S11 is executed again. In the exemplary embodiment, a series of steps S11-S20 of the character selection process is repeated until the determination result of step S20 is positive. If the determination result of step S20 is positive, the processor 81 ends the character selection process.

(Process of Game with Competition)

FIG. 17 is a flowchart showing an example of a flow of the process of the game with competition executed by the game system 1. In the exemplary embodiment, the process of the game with competition of FIG. 17 is triggered by the completion of the character selection process.

In step S21 shown in FIG. 17, the processor 81 changes the performance of an operational character based on a sub-character added to the operational character. Specifically, the processor 81 changes the performance of an operational character by the method described in the above section "[2-4. Process of game with competition]" such that an effect associated with a sub-character added to the operational character is given to the performance of the operational character. As a specific process, the processor 81 changes a parameter for an operational character that is indicated by the operational character data stored in a storage medium, based on a parameter (specifically, a parameter for an additional effect) for an additional character that is indicated by the additional character data stored in a storage medium. Note that the processor 81 stores the changed parameter separately from the operational character data stored in a storage medium. Following step S21, step S22 is executed.

In step S22, the processor 81 executes a game progress process for causing a game to progress in the game with competition. Specifically, the processor 81 controls an operation of an operational character in the virtual space in response to each player's operational input, and calculates the amount of damage to an operational character caused by another operational character's attack. Note that the amount of damage is calculated by the method described in the above section "[2-4. Process of game with competition]." Following step S22, step S23 is executed.

In step S23, the processor 81 generates a game image of the game with competition (see FIG. 13), and causes the display device to display the game image. Specifically, the processor 81 generates a game image of the virtual space in which an operational character is disposed, and an image of information about the operational character and a sub-character included in the above player display region. Thereafter, the processor 81 displays the image of information about the operational character and the sub-character, which overlays the game image of the virtual space. Following step S23, step S24 is executed.

In step S24, the processor 81 determines whether or not a condition for ending the game with competition (the above end condition) is satisfied. If the determination result of step S24 is negative, step S22 is executed again. In the exemplary embodiment, a series of steps S22-S24 of the process of the game with competition is repeated until the determination result of step S24 is positive. If the determination result of step S24 is positive, step S25 is executed.

In step S25, the processor 81 increases the experience point of an additional character that has been used in the game with competition. Specifically, the processor 81 increases the experience point of the additional character by the method described in the above section "[2-4. Process of game with competition]." If the level of the additional character is increased, the level is increased by one, and a predetermined parameter (specifically, offensive power and defensive power) of the additional character is increased. Note that in the exemplary embodiment, the processor 81 increases the experience point of each additional character that has been used by a player who is playing using the game system 1. Following step S25, step S26 is executed.

In step S26, the processor 81 determines whether or not the level of an additional character used in the game with competition has been increased. Specifically, the processor 81 determines whether or not one or more additional characters whose experience point has been increased in step S25 include any one whose level has been increased. If the determination result of step S26 is positive, step S27 is executed. Otherwise, the processor 81 ends the process of the game with competition.

In step S27, the processor 81 updates the parameter of an additional character whose level has been increased. Specifically, a predetermined parameter (e.g., the offensive power and defensive power parameters) of the additional character is changed such that the additional character can give a higher effect to an operational character. As a specific process, the processor 81 updates information about the predetermined parameter indicated by the additional character data stored in a storage medium, with the changed value. After the end of step S27, the processor 81 ends the process of the game with competition.

[4. Advantageous Features and Variations of Exemplary Embodiment]

As described above, in the exemplary embodiment, gamesmanship of players can be involved in selection of an operational character and an additional character. Thus, a strategy for selecting a character can be provided for the game with competition.

In addition, a player adds an additional character to an operational character in the game with competition, and therefore, the game system 1 can give a player the impression that an additional character participates together with an operational character in the game with competition. The game system 1 can cause more characters than operational characters to appear in the game with competition, resulting in an improvement in the amusingness of the game with competition. In the exemplary embodiment, the game system 1 does not dispose a model (e.g., a three-dimensional model) of a sub-character in the virtual space in which the game with competition is played, and therefore, the processing load of the character operation control process and the character image generation process in the game with competition can be reduced. In addition, the use of sub-characters, which can easily be caused to appear, allows a large number of characters to easily appear in the game with competition.

Note that in the exemplary embodiment, the effect that an additional character gives to an operational character is not particularly limited. A plurality of additional characters that give different effects may be prepared. As a result, an increased variety of effects that are given by additional characters may be provided, leading to an improvement in the strategic aspect of the game with competition. Note that some of the prepared additional characters may give the same effect to operational characters.

In the exemplary embodiment, an image of an additional character (e.g., the image 212 of FIG. 9 and the additional character icon 231 of FIG. 10) is displayed. Therefore, even in the case where a large number of additional characters are prepared, the additional characters can be easily remembered by a player.

Note that in the exemplary embodiment, two kinds of characters, additional characters and auxiliary characters, are prepared as a sub-character that is to be added to an operational character. Here, in another exemplary embodiment, only a single kind of sub-character (i.e., additional characters) may be added to an operational character.

The exemplary embodiment can be applied to, for example, a game apparatus or a game program, etc., in order to improve the strategic aspect of a game with competition, for example.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game apparatus comprising one or more processors configured to:
   select an operational character that is to be used by a player in a multiplayer game, based on an operational input for specifying one of a plurality of candidates for an operational character to be selected;
   select an additional character which causes the operational character to have at least one of a performance effect associated with the selected additional character in the multiplayer game or a type of the additional character is given to the operational character, based on an operational input for specifying one of a plurality of candidates as the additional character, the additional character being associated with an image of the additional character, information of the performance effect, and information about the type, the type having advantage or disadvantage over another type or no advantage and no disadvantage over other types;
   generate a selection image including at least an image of the operational character selected by the player and each other user participating in the multiplayer game, an image of the additional character selected by the player, and an image of the type of the additional character, for display, during selection of the operational character and the additional character; and
   control the selected operational character, in a virtual space, according to an operational input, and process the multiplayer game based on the performance of the operational character given the effect associated with the selected additional character, and the advantage and disadvantage of the type associated with the additional character.

2. The game apparatus according to claim 1, wherein the one or more processors are further configured to generate, in the multiplayer game, a game image including at least an image of the virtual space, an image of the selected operational character, an image of the selected additional character, and an image of the type of the additional character, for display.

3. The game apparatus according to claim 1, wherein the one or more processors store one or more of the additional characters that are previously specified by the player from a plurality of the additional characters, as a candidate for an additional character to be selected, and
the one or more processors select an additional character from the stored candidates for an additional to be selected, in the selecting an additional character.

4. The game apparatus according to claim 3, wherein the one or more processors are further configured to prepare a set of the additional character and an auxiliary character, and store the prepared set as a candidate for selection,
the auxiliary character is associated with at least an image of the auxiliary character, and information of an effect to be given to the performance in the multiplayer game of an operational character, and
wherein, the one or more processors process the multiplayer game based on the performance of the operational character given the effect of the additional character as well as the effect of the auxiliary character when the set is selected.

5. The game apparatus according to claim 4, wherein the additional character is associated with information of a capacity that is the maximum amount of the auxiliary character or characters which selected for the additional character,
the auxiliary character is associated with an amount of the auxiliary character that occupies the capacity when the auxiliary character is selected, and
the one or more processors prepare a set of the additional character and one or more of the auxiliary characters, in the preparing, provided that the amount of the auxiliary character or characters is smaller than or equal to the capacity of the additional character.

6. The game apparatus according to claim 1, wherein the one or more processors are further configured to update the information about the effect associated with each additional character such that the effect is enhanced, if a predetermined condition for the additional character is satisfied.

7. The game apparatus according to claim 1, wherein there are four kinds of types, three of the four kinds have a trilemma relationship and one of the four kinds is
without advantage and disadvantage to the three kinds of types and wherein the three kinds are the other types.

8. The game apparatus according to claim 7, wherein the one or more processors execute a fighting game in the multiplayer game, and determines the amount of damage to a first operational character caused by a second operational character's attack, based on (a) the performances of the first and second operational characters, and (b) the advantage and disadvantage between the type of an additional character selected for the first operational character and the type of an additional character selected for the second operational character.

9. The game apparatus according to claim 1, wherein the operational character is associated with information of an operational character group to which the operational character belongs,
the additional character is associated with information of an additional character group to which the additional character belongs, and
in the multiplayer game, if the additional character group to which the additional character selected for the operational character belongs corresponds to the operational character group to which the operational character belongs, the one or more processors increase the effect associated with the additional character more than if there is not the correspondence.

10. The game apparatus according to claim 9, wherein the selection image further includes an image of the operational character group to which the selected operational character belongs.

11. A non-transitory computer-readable storage medium having stored therein a game program executable by one or more processors of an information processing apparatus, wherein
the game program causes the one or more processors to:
select an operational character that is to be used by a player in a multiplayer game, based on an operational input for specifying one of a plurality of candidates for an operational character to be selected;
select an additional character which causes the operational character to have at least a performance effect associated with the selected additional character in the multiplayer game or a type of the additional character is given to the operational character, based on an operational input for specifying one of a plurality of candidates as the additional character, the additional character being associated with at least an image of the additional character, information of the performance effect to be given to performance in the multiplayer game of the operational character, and information about the type, the type having advantage or disadvantage over another type or no advantage and no disadvantage over other types;
generate a selection image including at least an image of the operational character selected by the player and each other user participating in the multiplayer game, an image of the additional character selected by the player, and an image of the type of the additional character, for display, during selection of the operational character and the additional character; and
control the selected operational character, in a virtual space, according to an operational input, and process a multiplayer game based on the performance of the operational character given the effect associated with the additional character selected by the additional character selection process, and the advantage and disadvantage of the type associated with the additional character.

12. The non-transitory computer-readable storage medium according to claim 11, wherein
the game program further causes the one or more processors to:
generate, in the multiplayer game, a game image including at least an image of the virtual space, an image of the selected operational character, an image of the selected additional character, and an image of the type of the additional character, for display.

13. The non-transitory computer-readable storage medium according to claim 11, wherein
one or more of the additional characters that are previously specified by the player are stored from a plurality of the additional characters, as a candidate for an additional character to be selected, in a storage medium of the information processing device, and
an additional character is selected from the stored candidates for an additional to be selected, in the selecting an additional character.

14. The non-transitory computer-readable storage medium according to claim 13, wherein the game program further causes the one or more processors to:
prepare a set of the additional character and an auxiliary character, and store the prepared set as a candidate for selection, in the storage medium of the information processing device,
the auxiliary character is associated with at least an image of the auxiliary character, and information of an effect to be given to the performance in the multiplayer game of an operational character, and
wherein, the one or more processors process the multiplayer game based on the performance of the operational character given the effect of the additional character as well as the effect of the auxiliary character when the set is selected.

15. The non-transitory computer-readable storage medium according to claim 14, wherein
the additional character is associated with information of a capacity that is the maximum amount of the auxiliary character or characters which are allowed to be selected,
the auxiliary character is associated with an amount of the auxiliary character that occupies the capacity when the auxiliary character is selected, and
a set of the additional character and one or more of the auxiliary characters is prepared in the set preparation process, provided that the amount of the auxiliary character or characters is smaller tor equal to the capacity of the additional character.

16. The non-transitory computer-readable storage medium according to claim 11, wherein
the game program further causes the one or more processors to:
update the information about the effect associated with each additional character such that the effect is enhanced, if a predetermined condition for the additional character is satisfied.

17. The non-transitory computer-readable storage medium according to claim 11, wherein there are four kinds of types, three of the four kinds have a trilemma relationship and one of the four kinds is
without advantage and disadvantage in relation to the three kinds of types and wherein the three kinds are the other types.

18. The non-transitory computer-readable storage medium according to claim 17, wherein
a fighting game is executed in the multiplayer game, and the amount of damage to a first operational character caused by a second operational character's attack is determined based on (a) the performances of the first and second operational characters, and (b) the advantage and disadvantage between the type of an additional character selected for the first operational character and the type of an additional character selected for the second operational character.

19. The non-transitory computer-readable storage medium according to claim 11, wherein
the operational character is associated with information of an operational character group to which the operational character belongs,
the additional character is associated with information of an additional character group to which the additional character belongs, and
in the multiplayer game, if the additional character group to which the additional character selected for the operational character belongs corresponds to the operational character group to which the operational character belongs, the effect associated with the additional character is increased more than if there is not the correspondence.

20. The non-transitory computer-readable storage medium according to claim 19, wherein
the selection image further includes an image of the operational character group to which the selected operational character belongs.

21. A game system comprising one or more processors configured to:
select an operational character that is to be used by a player in a multiplayer game, based on an operational input for specifying one of a plurality of candidates for an operational character to be selected;
select an additional character which causes the operational character to have at least a performance effect associated with the selected additional character in the multiplayer game or a type of the additional character is given to the operational character, based on an operational input for specifying one of a plurality of candidates as the additional character, the additional character being associated with at least an image of the additional character, information of the performance effect to be given to performance in the multiplayer game of the operational character and information about the type, the type having advantage and or disadvantage over another type or no advantage and no disadvantage over other types;
generate a selection image including at least an image of the operational character selected by the player and each other user participating in the multiplayer game, an image of the additional character selected by the player, and an image of the type of the additional character, for display, during selection of the operational character and the additional character; and
control the selected operational character, in a virtual space, according to an operational input, and processing a multiplayer game based on the performance of the operational character given the effect associated with the selected additional character, and the advantage and disadvantage of the type associated with the additional character.

22. A game processing method executable by a game system, comprising:
selecting an operational character that is to be used by a player in a multiplayer game, based on an operational input for specifying one of a plurality of candidates for an operational character to be selected;
selecting an additional character which causes the operational character to have at least a performance effect associated with the selected additional character in the multiplayer game or a type of the additional character is given to the operational character, based on an operational input for specifying one of a plurality of candidates as the additional character, the additional character being associated with at least an image of the additional character, information of the performance effect to be given to performance in the multiplayer game of the operational character, and information about the type, the type having advantage or disadvantage over another type or no advantage and no disadvantage over other types;
generating a selection image including at least an image of the operational character selected by the player and each other user participating in the multiplayer game, an image of the additional character selected by the player, and an image of the type of the additional character, for display, during selection of the operational character and the additional character; and
controlling the selected operational character, in a virtual space, according to an operational input, and processing a multiplayer game based on the performance of the operational character given the effect associated with the additional character selected by the additional character selection process, and the advantage and disadvantage of the type associated with the additional character.

* * * * *